United States Patent [19]

Ohira et al.

[11] Patent Number: 5,548,460
[45] Date of Patent: Aug. 20, 1996

[54] TAPE CASSETTE HAVING AN ESCAPE SLOT ARRANGEMENT

[75] Inventors: Tsunehisa Ohira; Hiroyuki Umeda, both of Sagamihara; Toshio Imamura, Yokohama, all of Japan

[73] Assignee: Victor Company of Japan, Ltd., Yokohama, Japan

[21] Appl. No.: 296,102

[22] Filed: Aug. 25, 1994

[30] Foreign Application Priority Data

Aug. 26, 1993 [JP] Japan ................................ 5-234222
Aug. 31, 1993 [JP] Japan ................................ 5-239167
Jan. 12, 1994 [JP] Japan ................................ 6-014005

[51] Int. Cl.$^6$ ........................................................ G11B 23/02
[52] U.S. Cl. ........................................................ 360/132
[58] Field of Search ........................ 360/132; 242/34 G, 242/347, 347.18, 2

[56] References Cited

U.S. PATENT DOCUMENTS 4,757,399  7/1988  Peterson ................................ 360/132
4,803,575  2/1989  Nishimura ............................ 360/132

FOREIGN PATENT DOCUMENTS 0392595  10/1990  European Pat. Off. .
0449330  10/1991  European Pat. Off. .

OTHER PUBLICATIONS

Japanese Utility Model Publication No. 5-19912/1993 by Victor Company of Japan, Ltd., published on May 25, 1993. Title: "Tape Cassette".

Japanese Utility Model Publication No. 63-17098/1988 by Fuji Photo Film Co. Ltd., published on May 16, 1988. Title: "Tape Cassette".

Japanese Utility Model Publication No. 5-14391/1993 by Victor Company of Japan, Ltd., published on Apr. 16, 1993. Title: "Tape Cassette".

*Primary Examiner*—A. J. Heinz
*Attorney, Agent, or Firm*—Michael N. Meller

[57] ABSTRACT

A tape cassette for a tape recording and reproducing apparatus having a cassette holder with an erroneous insertion preventing member. The cassette has a rectangular case having front and rear portions longer than a side portion, and has a loading pocket extending along the front portion, a magnetic tape wound on a pair of reels and extended along the loading pocket, a front lid provided at the front portion to cover the tape, an erroneous insertion preventing slot communicated to the loading pocket at a bottom of the case. The slot is extended to along a normal insertion of the cassette, with the front lid being forward, into the holder engaging with the erroneous insertion preventing member. An escaping slot is provided on the bottom of the case nearby the rear portion leaving a slight space therefrom. The escaping slot is disposed along an erroneous insertion direction of the cassette for allowing the erroneous insertion of the cassette, with the rear portion being forward, into the holder by causing the detecting member to be inserted into the escaping slot after a wall of the rear portion overrides the detecting member with the further erroneous insertion of the tape cassette into the holder.

7 Claims, 15 Drawing Sheets

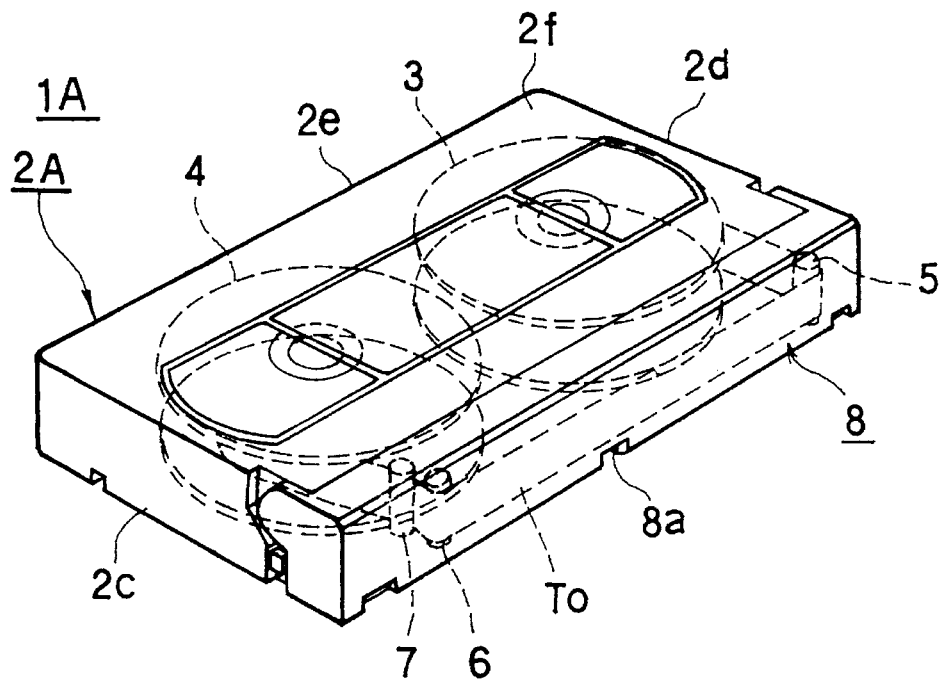
Fig.1 (A)   PRIOR ART
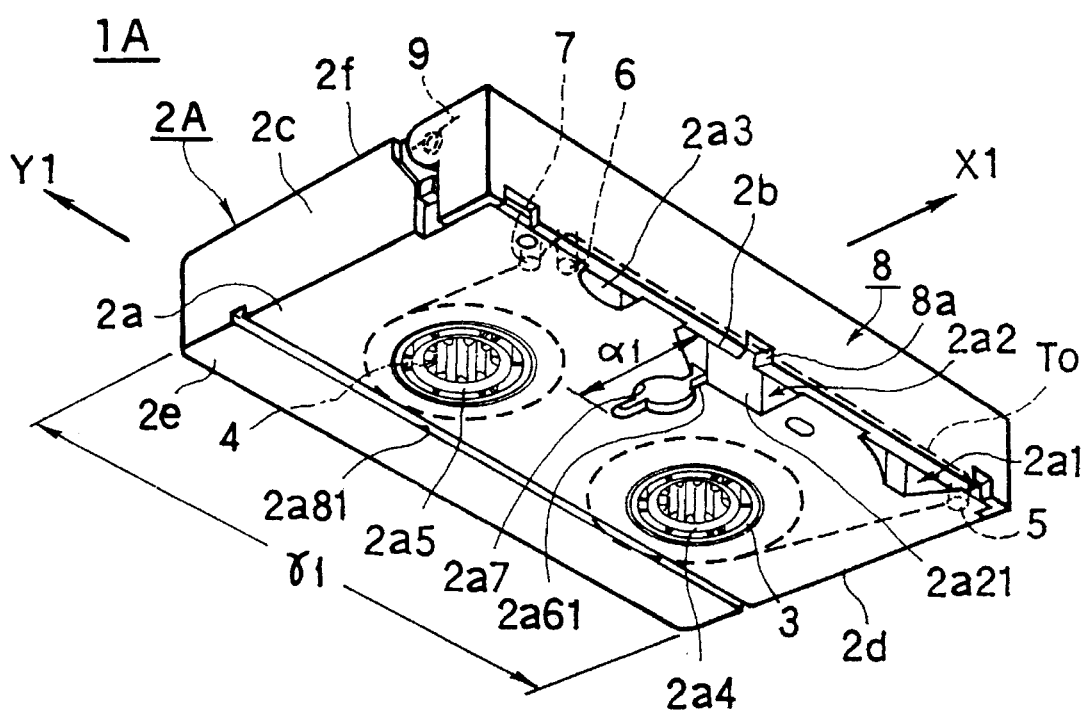
Fig.1 (B)   PRIOR ART

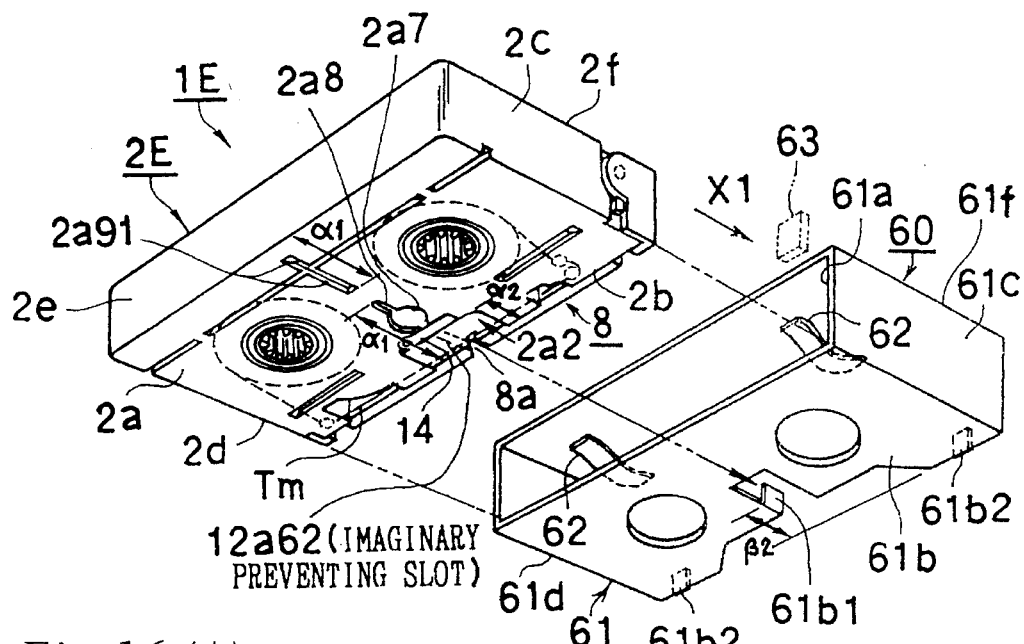
Fig.16 (A)
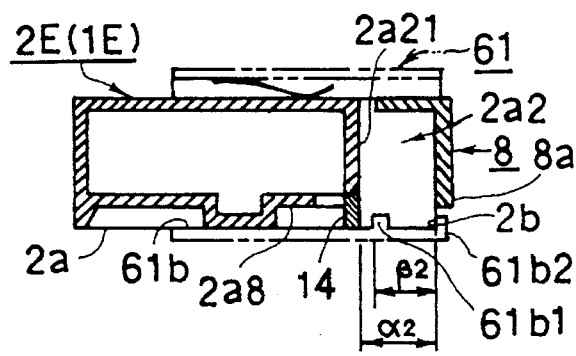
Fig.16 (B)
Fig.16 (C)
Fig.16 (D)

TAPE CASSETTE HAVING AN ESCAPE SLOT ARRANGEMENT

BACKGROUND OF THE INVENTION

1. Field of the Invention

The present invention relates to a tape cassette used in a magnetic recording and/or reproducing apparatus, and in particular, relates to a tape cassette having an erroneous insertion preventing function.

DESCRIPTION OF THE RELATES ART

A tape cassette used for a magnetic recording and/or reproducing apparatus such as a video tape recorder (referred to as a VTR hereinafter) is shown in FIG. 1(A) and FIG. 1(B) as an example of the prior art.

FIG. 1(A) is a perspective view of a tape cassette in the prior art illustrated from an upper side; and FIG. 1(B) is a perspective view of the tape cassette of the FIG. 1(A) which is illustrated from a bottom side.

FIG. 2(A) is a perspective view for explaining erroneous insertion preventing operation of the tape cassette in the prior art, wherein the tape cassette is going to be inserted in a normal manner in the direction of an arrow X1 onto a cassette holder provided in a standard recording and reproducing VTR (a standard type VTR) by causing a front lid of the tape cassette to be the head;

FIG. 2(B) is a cross-sectional view showing a state where the tape cassette is mounted on the cassette holder in a normal state;

FIG. 2(C) is a cross-sectional view showing a state where the tape cassette is erroneously inserted onto the cassette holder by causing the front lid of the tape cassette to be the rear and is prevented from being mounted on the cassette holder; and FIG. 2(D) is a cross-sectional view showing a state where the tape cassette is erroneously inserted onto the cassette holder by causing the front lid of the tape cassette to be the rear and rides on an erroneous insertion preventing and detecting member (detecting member).

FIG. 3(A) is a perspective view for explaining erroneous insertion preventing operation of the tape cassette in the prior art, wherein the tape cassette is going to be inserted in a normal manner in the direction of an arrow Y1 onto a cassette holder provided in another standard type VTR by causing a predetermined side face having a shorter side of the tape cassette to be the head;

FIG. 3(B) is a cross-sectional view showing a state where the tape cassette is mounted on the cassette holder in a normal state;

FIG. 3(C) is a cross-sectional view showing a state where the tape cassette is erroneously inserted onto the cassette holder by causing the predetermined side face thereof to be the rear and is prevented from being mounted on the cassette holder; and FIG. 3(D) is a cross-sectional view showing a state where the tape cassette is erroneously inserted onto the cassette holder by causing the predetermined side face thereof to be the rear and rides on an erroneous insertion preventing and detecting member (detecting member).

A VHS standard (industrial standard) tape cassette 1A (referred to as a tape cassette 1A) in the prior art, as shown in FIGS. 1(A) and 1(B), is equipped with a magnetic tape (referred to as an iron oxide tape) "To" made of a film base having a width of ½-in on which magnetic particles such as iron oxide particles are coated, and is constructed as a standard recording tape cassette in conformity with the VHS standard format to allow recording and reproducing operation.

A cassette casing (referred to as a casing) 2A which is one of constructional wrapping components of the tape cassette 1A is assembled from an upper half member and a lower half member made of resin into a rectangular box-shaped casing having a longer side and a shorter side which has a shorter length than the longer side in a plane by causing the upper and lower half members to be connected with screws.

Moreover, the iron oxide tape "To" is made to move between a supply reel 3 and a take-up reel 4 rotatably disposed in the casing 2A. The iron oxide tape "To" wound on the supply reel 3 is guided around a supply side guide pole 55 and along loading pockets 2a1–2a3 opened at a front of a bottom 2a of the casing 2A and is guided around take-up side guide poles 6, 7 so as to be taken-up around the take-up reel 14.

The casing 2A is provided with holes 2a4 and 2a5 on its bottom 2a, which are aligned correspondingly with the position of the supply reel 3 and the take-up reel 4. The loading pockets 2a1–2a3 of the casing 2A are opened so as to allow tape loading members (not-shown) of the apparatus to be inserted and to draw out the iron oxide tape "To" from the casing 2A.

On the other hand, a front lid 8 is provided on a front side of the loading pockets 2a1–2a3 for protecting the iron oxide tape "To" against dust or the like. This front lid 8, one of the constructional wrapping components of the tape cassette 1A, is so supported at the right-hand and left-hand sides of the casing 2A biased in a lid closed direction by a torsion spring 9 that it can be opened or closed, and is constructed by using resin as an elongated member corresponding to the longer side of the casing 2A.

Next, a description is given of an erroneous insertion preventing operation of the tape cassette 1A of the prior art, referring to FIGS. 1(A)–3(D).

As shown in FIG. 1(B) and FIG. 2(A), a first erroneous insertion preventing section (measure) is formed as a series of recesses on the bottom of the tape cassette 1A so as to be adaptable to a VHS standard type VTR 50 (referred to as a standard type VTR 50) constructed in conformity with the VHS standard format, wherein the tape cassette 1A is to be inserted onto a cassette holder 51 provided in the standard type VTR 50 in the direction of an arrow X1 by causing one of side faces having the longer side thereof to be the head, i.e., by causing the front lid 8 to be the head.

The first erroneous insertion preventing section comprises a cutout 8a shallowly provided approximately at a center of a lower edge of the front lid 8 and an erroneous insertion preventing slot (referred to as a preventing slot hereinafter) 2a61 shallowly provided on the bottom 2a of the casing 2A caused by being disposed in line with respect to the cutout 8a of the front lid 8. The preventing slot 2a61 is formed just behind the central loading pocket 2a2 starting from a front wall 2a21 of the loading pocket 2a2.

Incidentally, a distance from a front 2b of the casing 2A to an distal end of the preventing slot 2a61 is determined at a length of α1 mm. In a middle of the preventing slot 2a61, there is provided a lamp inserting hole 2a7 for inserting a lamp (not shown) equipped in the standard type VTR 50 to detect a tape starting marker and a tape ending maker of the iron oxide tape "To".

On the other hand, referring to FIG. 2(A), the cassette holder 51 is movably provided in the standard type VTR 50 so as to transfer the tape cassette 1A mounted thereon between a cassette insertion or an eject position situated in an upper position and a cassette holding position situated in a lower position of the standard type VTR 50, wherein the front lid 8 of the tape cassette 1A is opened on the way to the cassette holding position by a lid opening member (not shown), and the iron oxide tape "To" is drawn out from the tape cassette 1A and wound around a rotary drum having magnetic heads (not shown) at the cassette holding position by a loading member (not shown) of the standard type VTR 50.

Further, the cassette holder 51 made of a metal plate is formed in such that a width of an inlet 51a thereof is wide enough to allow the insertion of the tape cassette 1A in conformity with the longer side of the tape cassette 1A, and a height of the inlet 51a is formed slightly higher than that of the tape cassette 1A so as to permit inner leaf springs 52, 52 provided on the bottom of an upper plate 51f to press the upper surface 2f of the casing 2A downward when the tape cassette 1A is inserted into the cassette holder 51. Incidentally, an eject button 53 is provided nearby the inlet 51a of the cassette holder 51.

Moreover, an erroneous insertion preventing and detecting measure (referred to as a detecting member) 51b1 protrudes upward from the bottom plate 51b of the cassette holder 51 by being bent upward to engage with the first insertion preventing section (8a, 2a61) as mentioned in the foregoing. Further in the cassette holder 51, there are provided a pair of stoppers 51b2, 51b2 at a distal end of the bottom 51b thereof by being bent upward at a predetermined distance in the direction of the longer side. A distance from the detecting member 51b1 to an extending line passing through surfaces of the stoppers 51b2, 51b2 is determined at a length of $\beta1$ mm which is slightly smaller than the aforementioned length of $\alpha1$ mm.

Referring to FIGS. 2(A), 2(B), the tape cassette 1A is inserted into the cassette holder 51 from the inlet 51a by causing the front lid 8 to be the head so as to be mounted on the bottom 51b thereof. With the insertion of the tape cassette 1A, the casing 2A is restricted and guided by the inlet 51a and inner side surfaces 51c, 51d of the cassette holder 51 by causing both sides 2c, 2d of the casing 2A to be contacted with the inner side surfaces 51c, 51d of the cassette holder 51, so that the detecting member 51b1 provided on the inner position of the cassette holder 51 is inserted into and passed by the cutout 8a of the front lid 8, the central loading pocket 2a2 and the preventing slot 2a61 of the casing 2A in this order. The length of $\alpha1$ mm is larger than the length of $\alpha1$ mm as mentioned in the foregoing, thus the tape cassette 1A is fully inserted in the cassette holder 51 until the front 2b of the casing 2A abuts on the stoppers 51b2, 51b2 without abutting of the distal end of the preventing slot 2a61 on the detecting member 51b1, from which it is known that the tape cassette 1A is normally inserted onto the cassette holder 51.

On the other hand, as shown in FIG. 2(C), when the tape cassette 1A is inserted onto the cassette holder 51 by causing the rear side 2e having the longer side of the tape cassette 1A to be the head and causing the tape cassette 1A to be parallel to the bottom 51b of the cassette holder 51, the rear side 2e of the casing 2A abuts on the detecting member 51b1, so that the tape cassette 1A is not completely inserted onto the cassette holder 51 leaving the half of the tape cassette 1A outside, from which it is known that the tape cassette 1A is erroneously inserted onto the cassette holder 51.

As another example of an erroneous insertion, there is a case where the tape cassette 1A is inserted onto the cassette holder 51 upside down, however, the description is omitted here.

Next, as shown in FIGS. 1(B) and 3(A), a description is given of another case wherein the tape cassette 1A is normally inserted in a direction of Y1 onto a cassette holder 56 of another VHS standard recording and reproducing VTB 55 (referred to as a standard type VTR 55) by causing one of the sides 2c, 2d having shorter sides of the casing 2A to be the head. A second erroneous insertion preventing section (measure) of the tape cassette 1A adaptable to the above standard type VTR 55 is composed of an erroneous insertion preventing slot (referred to as a preventing slot) 2a81 having a straight shallow slot which is formed on the bottom 2a thereof extending from the side 2c to another side 2d of the casing 2A. The preventing slot 2a81 is formed to be deviated from a center line of the shorter side of the tape cassette 1A to the rear side 2e thereof and has a length of $\gamma1$ mm, the same length as that of the longer side of the casing 2A.

Referring to FIG. 3(A), in the standard type VTB 55, the tape cassette 1A is inserted onto the cassette holder 56 by causing a predetermined side, for instance, 2c having the shorter side thereof to be the head so that the front lid 8 faces to a loading opening 56d provided in the cassette holder 56, from which the iron oxide tape "To" is drawn out. The cassette holder 56 is movably provided in the standard type VTR 55 so as to go and return between a tape insertion position situated in an upper position thereof and a cassette holding position situated in a lower position thereof.

The cassette holder 56 made of a metal plate is provided with an inlet 56a for inserting the tape cassette 1A. A width of the inlet 56a is formed smaller in conformity with the length of the shorter side of the casing 2A compared with that of the aforementioned cassette holder 51, and a height of the inlet 56a is made slightly higher than that of the casing 2A so that an upper surface 2f of the casing 2A can be pressed by a leaf spring 57 provided on the back surface of the upper plate 56f. An eject button 58 is also provided nearby the inlet 56a.

Further, the cassette holder 56 is provided with an erroneous insertion preventing and detecting member (referred to as an detecting member) 56b1 on a bottom 56b thereof. The detecting member 56b1 protrudes upward from the bottom 56b by being bent upward so as to allow an engagement with the preventing slot 2a81 when the tape cassette 1A is inserted onto the cassette holder 56.

Moreover, the cassette holder 56 is provided with a stopper surface 56c at an innermost position from the inlet 56a. A distance from the stopper surface 56c to the detecting member 56b1 is determined at a length of $\delta1$ mm which is shorter than the aforementioned length of $\gamma1$ mm of the preventing slot 2a81.

When the tape cassette 1A is inserted onto the cassette holder 56 from the inlet 56a by causing the predetermined side 2c having shorter side thereof to be the head and causing the bottom 2a thereof to be parallel to the bottom 56b of the cassette holder 56.

Incidentally, with insertion of the tape cassette 1A, the front lid 8 and the rear side 2e opposite to the front lid 8 of the casing 2A are guided by the inlet 56a along the loading opening 56d and a side 56e of the cassette holder 56, thus the detecting member 56b1 is inserted into the preventing slot 2a81 provided on the bottom 2a of the tape cassette 1A until the predetermined side 2c of the casing 2A abuts on the stopper surface 56c of the cassette holder 56, from which a normal insertion of the tape cassette is detected.

When the tape cassette 1A is erroneously inserted onto the cassette holder 56, for instance, inserted by causing another side 2d having the shorter side of the casing 2A to be the head as shown in FIG. 3(C), and by causing the bottom of the casing 2A to be parallel to the bottom of the cassette holder 56, the side 2d of the casing 2A abuts on the detecting member 56b1 because the preventing slot 2a81 of the casing 2A is deviated from the center line of the shorter side. Thus, almost of the tape cassette 1A remains out the cassette holder 56, from which it is known that the erroneous insertion has been performed. As an erroneous insertion, there is a case where the tape cassette 1A is inserted onto the cassette holder 56 upside down, however, the description is omitted here.

As mentioned in the foregoing, in the standard type VTR 50 or 55 shown in FIG. 2(C) or FIG. 3(C), the erroneous insertion of the tape cassette 1A can be detected from abutting of the rear side 2e or the side 2d of the casing 2A on the detecting member 51b1 or 56b1 as far as the tape cassette 1A is inserted onto the cassette holder 51 or 56 by causing the bottom of the casing 2A to be parallel to the bottom 51b or 56b of the cassette holder 51 or 56.

However, as shown in FIGS. 2(D), 3(D), when the tape cassette 1A is inserted onto the cassette holder 51 or 56 in the erroneous state by causing the tape cassette 1A to be inclined upward forcibly, the rear side 2e or the side 2d of the casing 2A may ride on the detecting members 51b1 or 56b1 because of providing the clearance between the back face of the upper plate 51f or 56f of the cassette holder 51 or 56 and the upper surface 2f of the casing 2A, so that it may be unable to retract the tape cassette from the cassette holder 51 or 56 even when the eject button 53 or 58 is pushed. This requires decomposition of the standard type VTR 50 or 55 to retract the casing 2A therefrom, otherwise, the casing 2A has to be broken.

On the other hand, there is a demand for a high density recording and reproducing VTR capable of recording and reproducing an high definition television (HDTV) picture such as High Vision and an extended aspect-ratio TV screen picture. Thus, there was proposed, for instance, a VTR system newly developed in conformity with a W-VHS standard format for high density recording on Jan. 8, 1993, which differs from the VHS standard format in the prior art.

A high density recording tape cassette (referred to as a W-VHS standard tape cassette) newly developed in conformity with the W-VHS standard format takes approximately the same shape and size as those of the aforementioned standard tape cassette 1A (VHS) in conformity with the VHS standard format, because of allowing common use of the production facilities, cost reduction and common use of VTR mechanism.

The W-VHS standard tape cassette is equipped with a magnetic tape (referred to as a metal tape) composed of a thin film base having a width of ½-in on which magnetic metal particles such as CF are provided by a coating or a vapor deposition method. When the W-VHS standard tape cassette is inserted onto a newly developed VTR for which both the VHS standard tape cassette 1A and the W-VHS standard tape cassette newly developed are available, two-track recording and/or reproducing are/is performed according to the W-VHS standard format.

The newly developed high density recording tape cassette (the W-VHS standard tape cassette) can not be recorded or reproduced by using the standard VTR 50, or 55 because the kind of the magnetic tapes and the recording format thereof are different from that of the standard tape cassette (VHS) 1A of the prior art. Thus, there is a demand that the W-VHS standard tape cassette has to be inhibited to be inserted onto the standard VTRs 50, 55.

However, the W-VHS standard tape cassette may erroneously be inserted onto the standard type VTR 50 or 55 of the prior art by causing the tape cassette 1A to be inclined upward forcibly, and the wall of the rear side 2e or the wall of the side 2d of the casing 2A thereof may ride on the detecting member 51b1 or 56b1 as mentioned in the foregoing.

Thus, there are desired the VHS standard tape cassette 1A of the prior art which does not ride on the detecting member 51b1 or 56b1 when the tape cassette 1A is inserted onto the standard type VTR 50 or 55 in the erroneous state by causing the tape cassette 1A to be inclined upward, and the W-VHS standard tape cassette newly developed which does not ride on the detecting member 51b1 or 56b1 of the standard type VTR 50 or 55 when the W-VHS standard tape cassette is inserted onto the standard type VTR 50 or 55.

SUMMARY OF THE INVENTION

Accordingly, a general object of the present invention is to provide a novel and useful tape cassette in which the above disadvantage has been eliminated.

A more specific object of the present invention is to provide a tape cassette used for a magnetic recording and reproducing apparatus comprising a case being a rectangular box-like shape having front, rear and side portions, a length of the front and rear portions being longer than a length of the side portions, the case having a loading pocket provided along the front portion, a magnetic tape wound on a pair of reels accommodated in the case and extended along the loading pocket, a front lid provided at the front portion in opening and closing manners to respectively expose and cover the magnetic tape a first slot provided on a bottom of the case and communicated with the loading pocket for preventing erroneous insertion of the tape cassette into the magnetic recording and reproducing apparatus, the first slot extending along a normal insertion direction of the tape cassette for allowing the tape cassette being inserted in the normal insertion direction, with the front lid being forward, into a cassette holder having an erroneous insertion preventing and detecting member provided in the magnetic recording and reproducing apparatus, causing the erroneous insertion preventing and detecting member to be engaged with the first slot, and a second slot provided on the bottom of the case nearby the rear portion leaving a predetermined small space from a wall of the rear portion, the second slot being disposed along an erroneous insertion direction of the tape cassette for allowing the erroneous insertion thereof, with the rear portion being forward into the cassette holder, causing the erroneous insertion preventing and detecting member to be inserted into the second slot after the wall of the rear portion overriding the erroneous insertion preventing and detecting member upon further insertion of the tape cassette in the erroneous insertion direction.

Another specific object of the present invention is to provide a tape cassette a tape cassette used for a magnetic recording and reproducing apparatus comprising, a case being a rectangular box-like shape having front and rear portions, and first and second side portions, the first side portion being opposed to the second side portion, a length of the front and rear portions being longer than a length of the first and second side portions, the case having a loading pocket provided along the front portion, a magnetic tape wound on a pair of reels accommodated in the case and extended along the loading pocket, a front lid provided at the front portion in opening and closing manners to respectively expose and cover the magnetic tape, a first slot provided on a bottom of the case for preventing an erroneous insertion of the tape cassette into the magnetic recording and reproducing apparatus, the first slot extending from a wall of the first side along a normal insertion direction of the tape cassette for allowing the tape cassette being inserted in the normal insertion direction, with the first side portion being forward, into a cassette holder having an erroneous insertion preventing and detecting member provided in the magnetic recording and reproducing apparatus, causing the erroneous insertion preventing and detecting member to be engaged with the first slot, and a second slot provided on the bottom of the case nearby the second side portion leaving a predetermined small space from a wall of the second side portion, the second slot being disposed along an erroneous insertion direction of the tape cassette for allowing the erroneous insertion thereof with second side portion being forward into the cassette holder, causing the erroneous insertion preventing and detecting member to be inserted into the second slot after a wall of the second side portion overriding the erroneous insertion preventing and detecting member upon further insertion of the tape cassette in the erroneous insertion direction.

Another specific object of the present invention is to provide a tape cassette used for a magnetic recording and reproducing apparatus, the tape cassette having a construction approximately same as a standard tape cassette constructed in conformity to an industry standard recording format used for a standard magnetic recording and reproducing apparatus, the standard tape cassette having a first case being a rectangular box-like shape having a first front portion longer than a first side portion thereof, and a first loading pocket provided along the first front portion, a first magnetic tape for recording and reproducing information signals thereon in conformity to the industry standard recording format, the first magnetic tape wound on a pair of reels accommodated in the first case and extended along the first loading pocket, a first front lid provided at the first front portion in opening and closing manners to respectively expose and cover the first magnetic tape; and a first erroneous insertion preventing slot communicated to the first loading pocket on the first case, wherein the standard tape cassette is normally inserted, with the first front lid being forward, into a first cassette holder having a first erroneous insertion preventing and detecting member provided in the standard magnetic recording and reproducing apparatus and by causing the first erroneous insertion preventing slot to be inserted with the first erroneous insertion preventing and detecting member, said tape cassette comprising, a second case being a rectangular box-like shape identical to the first case, the second case having a second front portion and a second side portion, and a second loading pocket provided along the second front portion, a second magnetic tape for recording and reproducing information signals thereon in conformity to another industry standard recording format, the second magnetic tape wound on a pair of reels accommodated in the second case and extended along the second loading pocket a second front lid provided at the second front portion in opening and closing manners to respectively expose and cover the second magnetic tape, a second erroneous insertion preventing slot provided in a position corresponding to the first erroneous insertion preventing slot of the first case, the second erroneous insertion preventing slot having a length substantially shorter than the first erroneous insertion preventing slot, and an escaping slot provided on a bottom of the second case slightly behind the second erroneous insertion preventing slot leaving a predetermined small space from a wall of a distal end of the second erroneous insertion preventing slot, wherein said tape cassette is allowed to be erroneously inserted, with the second front lid being forward, into a first cassette holder having a first erroneous insertion preventing and detecting member provided in said magnetic recording and reproducing apparatus and by causing the first erroneous insertion preventing and detecting member to be inserted in the escaping slot after the wall of the distal end of the second erroneous insertion preventing slot overrides the first erroneous insertion preventing and detecting member.

Another specific object of the present invention is to provide a tape cassette used for a magnetic recording and reproducing apparatus, the tape cassette having a construction approximately same as a standard tape cassette constructed in conformity to an industry standard recording format used for a standard magnetic recording and reproducing apparatus, the standard tape cassette having a first case being a rectangular box-like shape having a first front portion longer than a first side portion thereof, and a first loading pocket provided along the first front portion, a first magnetic tape for recording and reproducing information signals thereon in conformity to the industry standard recording format, the first magnetic tape wound on a pair of reels accommodated in the first case and extended along the first loading pocket, a first front lid provided at the first front portion in opening and closing manners to respectively expose and cover the first magnetic tape, and a first erroneous insertion preventing slot communicated to the first side portion, wherein the standard tape cassette is normally inserted, with the first side being forward, into a first cassette holder having a first erroneous insertion preventing and detecting member provided in the standard magnetic recording and reproducing apparatus by causing the first erroneous insertion preventing and detecting member to insert into the first erroneous insertion preventing slot, said tape cassette comprising, a second case being a rectangular box-like shape identical to the first case, the second case having a second front portion and a second side portion, and a second loading pocket provided along the second front portion, a second magnetic tape for recording and reproducing information signals thereon conformity to another industry standard recording format, the second magnetic tape wound on a pair of reels accommodated in the second case and extended along the second loading pocket, a second front lid provided at the second front portion in opening and closing manners to respectively expose and cover the second magnetic tape, a second erroneous insertion preventing slot provided in a position corresponding to the first erroneous insertion preventing slot of the first case, the second erroneous insertion preventing slot having a length substantially shorter than the first erroneous insertion preventing slot; and an escaping slot provided on a bottom of the second case slightly behind the second erroneous insertion preventing slot leaving a predetermined small space from a wall of a distal end of the second erroneous insertion preventing slot, wherein said tape cassette is allowed to be erroneously inserted, with the second side portion being forward, into a first cassette holder having a first erroneous insertion preventing and detecting member provided in said magnetic recording and reproducing apparatus and by causing the first erroneous insertion preventing and detecting member to be inserted in the escaping slot after the wall of the distal end of the second erroneous insertion preventing slot overrides the first erroneous insertion preventing and detecting member.

Another specific object of the present invention is to provide a tape cassette used for a magnetic recording and reproducing apparatus, the tape cassette having a construction approximately same as a standard tape cassette constructed in conformity to an industry standard recording format used for a standard magnetic recording and reproducing apparatus, the standard tape cassette having a first case being a rectangular box-like shape having a first front portion longer than a first side portion thereof, and a first loading pocket provided along the first front portion, a first magnetic tape for recording and reproducing information signals thereon in conformity to the industry standard recording format, the first magnetic tape wound on a pair of reels accommodated in the first case and extended along the first loading pocket, a first front lid provided at the first front portion in opening and closing manners to respectively expose and cover the first magnetic tape, and a first erroneous insertion preventing slot communicated to the first loading pocket on the first case, wherein the standard tape cassette is normally inserted, with the first front lid being forward, into a first cassette holder having a first erroneous insertion preventing and detecting member provided in the standard magnetic recording and reproducing apparatus and by causing the first erroneous insertion preventing slot to be inserted with the first erroneous insertion preventing and detecting member, said tape cassette comprising, a second case being a rectangular box-like shape identical to the first case, the second case having a second front portion and a second side portion, and a second loading pocket provided along the second front portion, a second magnetic tape for recording and reproducing information signals thereon in conformity to another industry standard recording format, the second magnetic tape wound on a pair of reels accommodated in the second case and extended along the second loading pocket, a second front lid provided at the second front portion in opening and closing manners to respectively expose and cover the second magnetic tape, a second erroneous insertion preventing slot provided in a position corresponding to the first erroneous insertion preventing slot of the first case, the second erroneous insertion preventing slot having a length substantially shorter than that of the first erroneous insertion preventing slot, and an escaping slot provided on a bottom of the second case slightly behind the second erroneous insertion preventing slot leaving a closed area defined between a wall of the second loading pocket and a distal end of the escaping slot, the escaping slot having a tapered wall at the distal end thereof for enabling the first erroneous insertion preventing and detecting member to escape from the escaping slot, the closed area being reinforced with a material having a larger strength than that of the second case, wherein said tape cassette is allowed to be erroneously inserted, with the second front lid being forward, into a first cassette holder having a first erroneous insertion preventing and detecting member provided in said magnetic recording and reproducing apparatus by causing the first erroneous insertion preventing and detecting member to be inserted into the escaping slot after the closed area overrides the first erroneous insertion preventing and detecting member.

Another specific object of the present invention is to provide a tape cassette used for a magnetic recording and reproducing apparatus, the tape cassette having a construction approximately same as a standard tape cassette constructed in conformity to an industry standard recording format used for a standard magnetic recording and reproducing apparatus having a first cassette holder provided with a first erroneous insertion preventing and detecting member, the standard tape cassette having a first case being a rectangular box-like shape having a first front portion longer than a first side portion thereof, and a first loading pocket provided along the first front portion; a first magnetic tape for recording and reproducing information signals thereon in conformity to the industry standard recording format, the first magnetic tape wound on a pair of reels accommodated in the first case and extended along the first loading pocket, a first front lid provided at the first front portion in opening and closing manners to respectively expose and cover the first magnetic tape, and a first erroneous insertion preventing slot communicated to the first loading pocket on the first case, wherein the standard tape cassette is normally inserted, with the first front lid being forward, into a first cassette holder having a first erroneous insertion preventing and detecting member provided in the standard magnetic recording and reproducing apparatus and by causing the first erroneous insertion preventing slot to be inserted with the first erroneous insertion preventing and detecting member, said magnetic recording and reproducing apparatus being provided with a second cassette holder having a second erroneous insertion preventing and detecting member, said tape cassette comprising, a second case being a rectangular box-like shape identical to the first case, the second case having second front and rear portions and a second side portion, and a second loading pocket provided along the second front portion, a second magnetic tape for recording and reproducing information signals thereon in conformity to another industry standard recording format, the second magnetic tape wound on a pair of reels accommodated in the second case and extended along the second loading pocket, a second front lid provided at the second front portion in opening and closing manners to respectively expose and cover the second magnetic tape, wherein said tape cassette can be inserted, with the second front lid being forward, into the second cassette holder of said magnetic recording and reproducing apparatus and the first cassette holder of the standard magnetic recording and reproducing apparatus, a second erroneous insertion preventing slot defined in the second loading pocket on the second case, the second erroneous insertion preventing slot having a length substantially identical to a length from the second front portion to a front wall of the second loading pocket, and the length of the second erroneous insertion preventing slot being substantially shorter than a length of the first erroneous insertion preventing slot, when said tape cassette is inserted into the second cassette holder, the second erroneous insertion preventing and detecting member is allowed to be inserted into the second erroneous insertion preventing slot, a door provided on the front wall of the second loading pocket in opening and closing manners, and an escaping slot provided on a bottom of the second case and behind the door, the escaping slot extending in an inserting direction of said tape cassette into said magnetic recording and reproducing apparatus, the door being allowed to open toward the second front portion of the second case and inhibited to open toward the rear portion of the second tape cassette, wherein said tape cassette is allowed to be erroneously inserted into the first cassette holder of the standard magnetic recording and reproducing apparatus by causing the first erroneous insertion preventing and detecting member to be inserted into the escaping slot after the door held in a closed state overrides the first erroneous insertion preventing and detecting member, and the tape cassette is allowed to be retracted by causing the door to be opened when the tape cassette is ejected from the standard recording and reproducing apparatus.

BRIEF DESCRIPTION OF THE DRAWINGS

FIG. 1(A) is a perspective view of a tape cassette in the prior art illustrated from an upper side;

FIG. 1(B) is a perspective view of the tape cassette of the FIG. 1(A) which is illustrated from a bottom side;

FIG. 16(A) is a perspective view for explaining erroneous insertion preventing operation of the tape cassette in the forth embodiment, wherein the tape cassette is going to be inserted in a normal manner in the direction of an arrow X1 onto a cassette holder provided in the compatible type VTR by causing a front lid of the tape cassette to be the head;

FIG. 16(B) is a cross-sectional view showing a state where the tape cassette is mounted on the cassette holder in a normal state;

FIG. 16(C) is a cross-sectional view showing a state where the tape cassette of the forth embodiment cassette is erroneously inserted onto the cassette holder of the compatible type VTR by causing the front lid of the tape cassette to be the rear and is prevented from being mounted on the cassette holder;

FIG. 16(D) is a cross-sectional view showing a state where the tape cassette is erroneously inserted onto the cassette holder by causing the front lid of the tape cassette to be the rear and the detecting member of the cassette holder is finally inserted into the escaping slot;

DETAILED DESCRIPTION OF THE PREFERRED EMBODIMENTS

Figure 2:
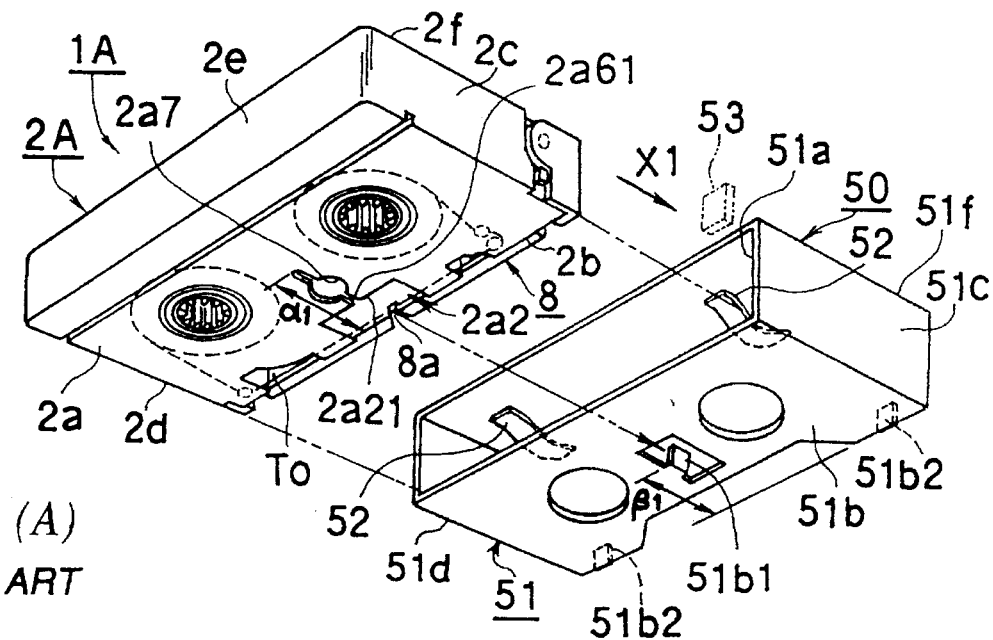
FIG. 2(A) is a perspective view for explaining erroneous insertion preventing operation of the tape cassette in the prior art, wherein the tape cassette is going to be inserted in a normal manner in the direction of an arrow X1 onto a cassette holder provided in a standard recording and reproducing VTR (a standard type VTR) by causing a front lid of the tape cassette to be the head.
FIG. 2(B) is a cross-sectional view showing a state where the tape cassette is mounted on the cassette holder in a normal state.
FIG. 2(C) is a cross-sectional view showing a state where the tape cassette is erroneously inserted onto the cassette holder by causing the front lid of the tape cassette to be the rear and is prevented from being mounted on the cassette holder.
FIG. 2(D) is a cross-sectional view showing a state where the tape cassette is erroneously inserted onto the cassette holder by causing the front lid of the tape cassette to be the rear and rides on an erroneous insertion preventing and detecting member (detecting member)
Figure 2:
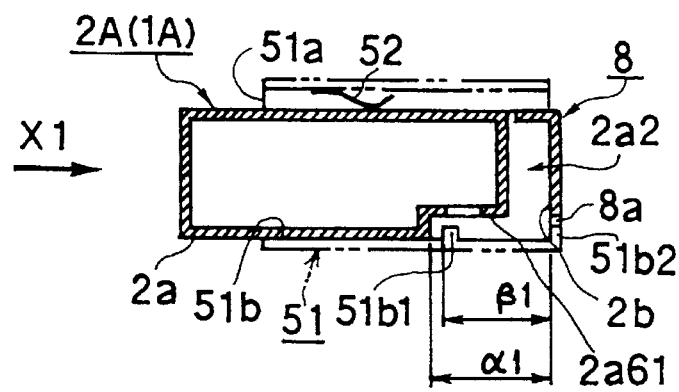
Figure 2:
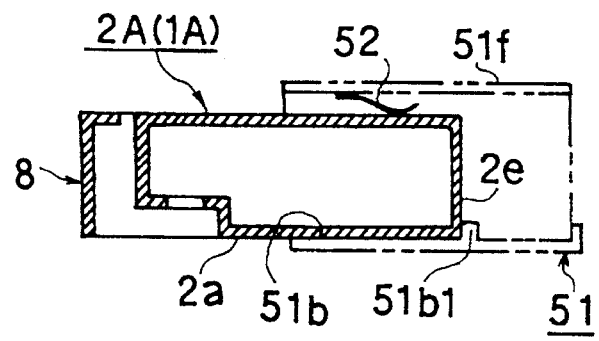
Figure 2:
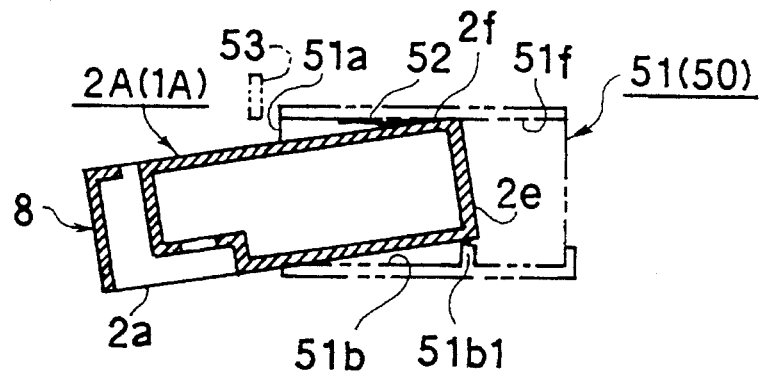

The tape cassette according to the present invention will be described in the following in connection with the embodiments 1–4 thereof with reference to FIG. 4(A) to FIG. 18(C).

<First Embodiment>

FIG. 4(A) is a perspective view of a VH8 standard tape cassette (a tape cassette) illustrated from a bottom side thereof according to a first embodiment of the present invention;

FIG. 4(B) is a cross-sectional view of a first erroneous insertion preventing section and an escaping slot along the shorter side of the tape cassette;

FIG. 4(C) is a cross-sectional view of an escaping slot along the longer side of the tape cassette; and FIG. 4(D) is a partially enlarged view of the FIG. 4(C).

FIG. 5(A) is a perspective view for explaining erroneous insertion preventing operation of the tape cassette of the first embodiment, wherein the tape cassette is going to be inserted in a normal manner in the direction of an arrow X1 onto a cassette holder provided in the standard type VTR by causing a front lid of the tape cassette to be the head;

FIG. 5(B) is a cross-sectional view showing a state where the tape cassette is mounted on the cassette holder in a normal state;

FIG. 5(C) is a cross-sectional view showing a state where the tape cassette is erroneously inserted onto the cassette holder by causing the front lid of the tape cassette to be the rear and is prevented from being mounted on the cassette holder; and FIG. 5(D) is a cross-sectional view showing a state where the tape cassette is erroneously inserted onto the cassette holder by causing the front lid of the tape cassette to be the rear and the detecting member of the cassette holder is inserted into the escaping slot.

FIG. 6(A) is a perspective view for explaining erroneous insertion preventing operation of the tape cassette of the first embodiment, wherein the tape cassette is going to be inserted in a normal manner in the direction of an arrow Y1 onto a cassette holder provided in another standard type VTR by causing a predetermined side face having a shorter side of the tape cassette to be the head;

FIG. 6(B) is a cross-sectional view showing a state where the tape cassette is mounted on the cassette holder in a normal state;

FIG. 6(C) is a cross-sectional view showing a state where the tape cassette is erroneously inserted onto the cassette holder by causing the predetermined side face thereof to be the rear and is prevented from being mounted on the cassette holder; and FIG. 6(D) is a cross-sectional view showing a state where the tape cassette is erroneously inserted onto the cassette holder by causing the predetermined side face thereof to be the rear and the detecting member of the cassette holder is inserted into the escaping slot.

A VHS standard tape cassette 1B (referred to as a tape cassette 1B) of a first embodiment according to the present invention as shown in the FIGS. 4(A)–4(D) is constructed approximately same to the aforementioned tape cassette 1A in the prior art, thus the like parts are shown by corresponding reference characters through the several views of the drawings. That is, the tape cassette 1B is equipped with the iron oxide tape "To" in a cassette casing 2B (referred to a casing 2B) thereof approximately in the same manner and has the same shape and size as those of the tape cassette 1A in the prior art as described in the foregoing.

In the first embodiment, however, the tape cassette 1B has such a constructional feature as provided with an escaping slot 2a91 and escaping slots 2a92–2a93 formed on a bottom 2a of the casing 2B. When the tape cassette 1B is erroneously inserted onto the cassette holder 51 or 56 of the standard type VTB 50 or 55 by causing the tape cassette 1B to be inclined upward, the tape cassette 1B may ride on the detecting member 51b1 or 56b1 of the cassette holder 51 or 56 as mentioned in the foregoing. In the present invention, however, after the tape cassette 1B overrides the detecting member 51b1 or 56b1 thereof by being pushed, the detecting member 51b1 or 56b1 is inserted into the escaping slot 2a91, 2a92 or 2a93 by a further forcible insertion as described hereinafter.

As shown in FIG. 4(A) and FIG. 5(A), a first erroneous insertion preventing section of the present invention for preventing erroneous insertion of the tape cassette 1B on the cassette holder 51 of the standard type VTR 50 by causing one of sides having a longer side of the tape cassette 1B to be the head is formed as a series of recesses on the bottom 2a of the tape cassette 1B so as to be adaptable to the standard type VTB 50 as mentioned in the foregoing, wherein the tape cassette 1B is normally to be inserted onto the cassette holder 51 of the standard type VTR 50 in the direction of the arrow X1 by causing the front lid 8 to be the head.

The first erroneous insertion preventing section comprises a cutout 8a shallowly provided approximately at a center of the lower edge of a front lid 8 and an erroneous insertion preventing slot (referred to as a preventing slot hereinafter) 2a61 provided shallowly on the bottom 2a of the casing 2A caused by being disposed in line with respect to the cutout 8a of the front lid 8. The preventing slot 2a61 is formed just behind the loading pocket gag to start from a front wall 2a21 of the central loading pocket 2a2 which is formed at a front center of the bottom 2a thereof.

Incidentally, a distance from the front 2b of the casing 2B to an distal end of the preventing slot 2a61 is determined at a length of α1 mm. In a middle of the preventing slot 2a61, there is provided a lamp inserting hole 2a7 for inserting a lamp (not shown) equipped in the standard type VTR 50 as mentioned in the foregoing.

On the other hand, as shown in FIGS. 4(A) and 6(A), a second erroneous insertion preventing section of the tape cassette 1B for preventing an erroneous insertion in a direction of Y1 onto a cassette holder 56 of the standard type VTR 55 by causing one of sides 2c, 2d having shorter sides of the casing 2B to be the head, is composed of an erroneous insertion preventing slot (referred to as a preventing slot) 2a81 having a straight shallow slot which is formed along the longer side thereof on the bottom 2a thereof extending from a side 2c to another side 2d of the casing 2B. The preventing slot 2a81 is formed to be deviated from a center line of the shorter side of the tape cassette 1B to the rear side 2e thereof and has a length of $\gamma_1$ mm, which is the same length as that of the longer side of the casing 2B as well as that of the prior art.

Next, a description is given of the escaping slots 2a91–2a93 which are main parts of the present invention referring to FIGS. 4(B)–4(D).

The escaping slot 2a91 is shallowly and straightly formed on the bottom 2a of the casing 2B correspondingly with the erroneous insertion of the tape cassette 1B onto the cassette holder 51 of the standard VTR 50 by causing the rear side 2e having the longer side of the tape cassette 1B to be the head. This escaping slot 2a91 is provided in the direction of an arrow X1 nearby the rear side 2e of the casing 2B leaving a slight space from the rear side 2e. The escaping slot 2a91 is disposed in line with respect to an extended line of the preventing slot 2a61 along the erroneous insertion direction of the tape cassette 1B so as to be engaged with the detecting member 51b1 of the cassette holder 51 when the tape cassette 1B is erroneously inserted thereonto. Incidentally, a length from the rear side 2e to the end of the escaping slot 2a91 is made more than the length of α1 mm.

Moreover, as shown in FIG. 4(B), the escaping slot 2a91 is provided with a slope surface "K" at a distal end thereof on the rear side 2e of the casing 2B for enabling the detecting member 51b1 of the cassette holder 51 to easily escape from the escaping slot 2a91 when the tape cassette is ejected, as described hereinafter.

On the other hand, a pair of escaping slots 2a92–2a93 correspondingly with the erroneous insertion of the tape cassette 1B by causing one of the sides 2c, 2d having the shorter side thereof to be the head are shallowly and straightly provided on the bottom 2a thereof from the sides 2c, 2d of the casing 2B.

These escaping slots 2a92, 2a93 are respectively extended in insertion directions of the tape cassette 1B shown with an arrow Y1 just behind the sides 2c, 2d of the casing 2B leaving a slight space in the direction of the arrow Y1. These escaping slots 2a92, 2a93 are disposed to be parallel to the preventing slot 2a81 separated at a predetermined distance and to be symmetrical to the preventing slot 2a81 with respect to a center line of the shorter side of the tape cassette 1B.

Incidentally, lengths from the sides 2c, 2d of the casing 2B to the ends of the escaping slots 2a92, 2a93 are made fairly long. Of course, the escaping slots 2a92, 2a93 may be made a long straight line by causing the distal ends of the escaping slots 2a92, 2a93 to be connected to each other.

Moreover, as shown in FIG. 4(C), the escaping slot 2a93, for instance, is provided with a slope surface "K" at a distal end thereof on the side 2d of the casing 2B for enabling the detecting member 56b1 to easily escape from the escaping slot 2a93 when the tape cassette 1B is ejected, as described hereinafter. As to the escaping slot 2a92, the VTR to be used is different from the standard type VTR 55, thus the description is omitted here.

Moreover, as shown in FIG. 4(D), when edges of the sides 2c, 2d and the rear side 2e on the bottom 2a of the casing 2B are respectively provided with round surfaces "R", cutouts having perpendicular surfaces "S" are provided in the round surfaces "R" to abut on the detecting members (51b1, 56b1) so as to prevent the tape cassette 1B from being inserted onto the cassette holder 51 or 56. In that case, the escaping slots (2a91–2a93) are formed on the bottom 2a by providing predetermined slight spaces interposed between the perpendicular surfaces "S" and the distal ends of the escaping slots (2a91–2a93).

Next, a description is given of the erroneous preventing operations of the tape cassette 1B onto the standard type VTRs 50, 55 referring to FIGS. 5(A)–6(D).

As shown in FIGS. 5(A) and 5(B), when the tape cassette 1B is normally inserted onto the cassette holder 51 of the standard type VTB 50 (VHS) by causing the front lid 8 to be the head, the operation of the first erroneous insertion preventing section is the same as that of the tape cassette 1A in the prior art shown in FIGS. 2(A), 2(B), thus the description is omitted here.

Further, as sown in FIG. 5(C), when the tape cassette 1B is erroneously inserted onto the cassette holder 51 of the standard type VTR 50 (VHS) by causing the rear side 2e thereof to be the head and by causing the tape cassette 1B to be parallel to the bottom of the cassette holder 51, the operation of the first erroneous insertion preventing section is the same as that of the tape cassette 1A in the prior art shown in FIG. 2(C), thus the description is also omitted here.

Further, in a state shown in FIG. 5(D), when the tape cassette 1B is erroneously inserted onto the cassette holder 51 in the direction as shown in FIG. 5(C), there is a slight clearance between the back face of the upper plate 51f of the cassette holder 51 and the upper surface 2f of the casing 2B because the height of the cassette holder 51 is higher than that of the casing 2B as mentioned in the foregoing. In this state, when the tape cassette 1B is inserted onto the cassette holder 51 by causing the rear side 2e thereof to be the head and by causing the tape cassette 1B to be inclined upward forcibly, a front wall of the rear side 2e rides on the detecting member 51b1. When the tape cassette 1B is further forcibly inserted onto the cassette holder 51 by a user who is not conscious of it, the detecting member 51b1 is inserted into the escaping slot 2a91 after the front wall of the rear side 2e overrides the detecting member 51b1.

As the length of the escaping slot 2a91 is formed more than the length of α1 mm, the detecting member 51b remains within the escaping slot 2a91 without abutting on the distal end thereof until the the rear side 2e abuts on the stoppers 5162, 5162. Thus, the tape cassette 1B is fully inserted into the cassette holder 51 in the erroneous state.

After that, before the tape cassette 1B is transferred to the cassette holding position of the standard type VTR 50 by the cassette holder 51, the eject-mode can be automatically established by detecting that the front lid 8 can not be opened by the lid opening device of the apparatus, or can be established by the user who is conscious of his erroneous insertion and pushes the eject button 53. Thus, the tape cassette 1B can be taken out from the cassette holder 51 by the user. Incidentally, the tapered surface "K" is provided at the distal end of the escaping slot 2a91 on the rear side 2e, thus the tape cassette 1B can be easily drawn out from the cassette holder 51 along the tapered surface "K".

As will be understood from the above description, the tape cassette 1B is securely retracted from the cassette holder 51 without the decomposition of the standard type VTR 50 or any damage of the tape cassette 1B even when the tape cassette 1B is erroneously inserted onto the cassette holder 51 of the standard type VTR 50 by causing the rear side 2e having the longer side thereof to be the head and by causing the tape cassette 1B to be inclined upward.

Figure 3:
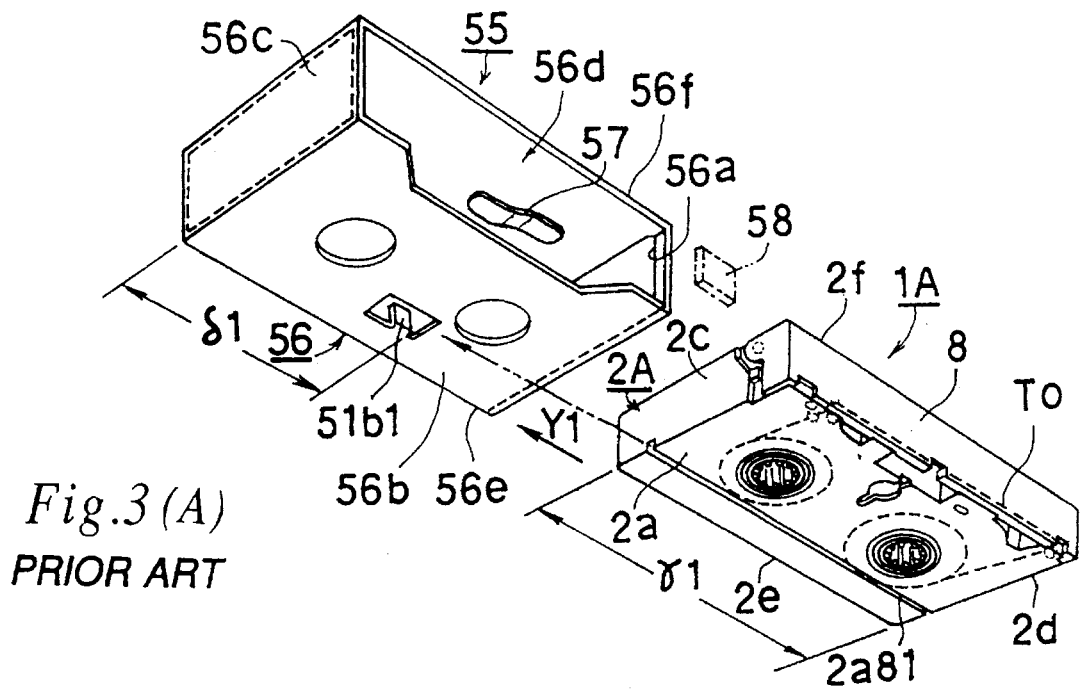
FIG. 3(A) is a perspective view for explaining erroneous insertion preventing operation of the tape cassette in the prior art, wherein the tape cassette is going to be inserted in a normal manner in the direction of an arrow Y1 onto a cassette holder provided in another standard type VTR by causing a predetermined side face having a shorter side of the tape cassette to be the head.
FIG. 3(B) is a cross-sectional view showing a state where the tape cassette is mounted on the cassette holder in a normal state.
FIG. 3(C) is a cross-sectional view showing a state where the tape cassette is erroneously inserted onto the cassette holder by causing the predetermined side face thereof to be the rear and is prevented from being mounted on the cassette holder.
FIG. 3(D) is a cross-sectional view showing a state where the tape cassette is erroneously inserted onto the cassette holder by causing the predetermined side face thereof to be the rear and rides on an erroneous insertion preventing and detecting member (detecting member)
Figure 3:
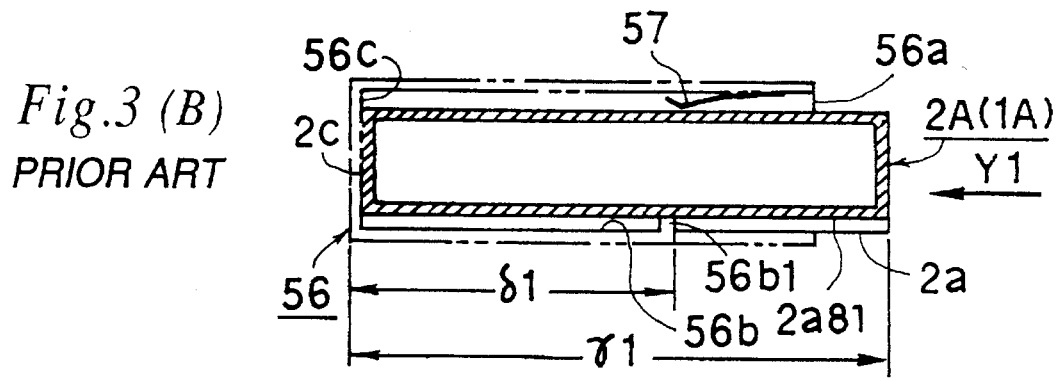
Figure 3:
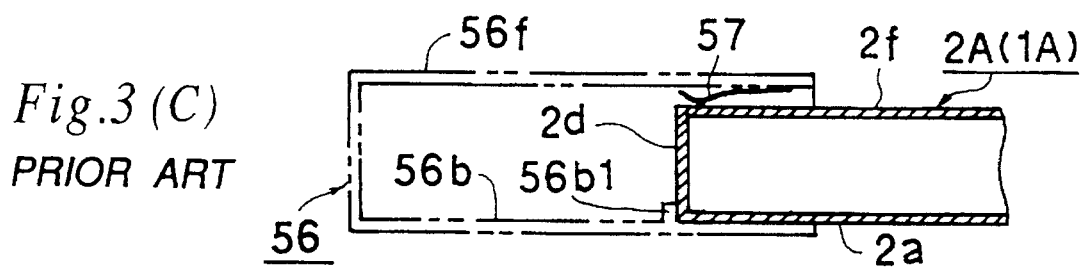
Figure 3:
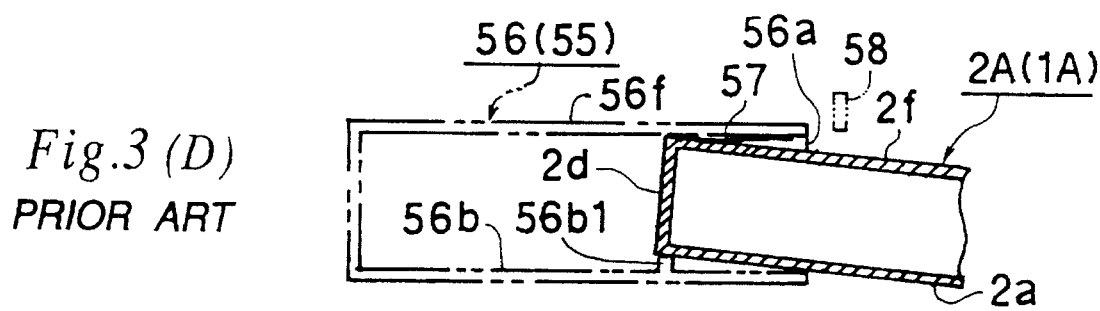
Figure 4:
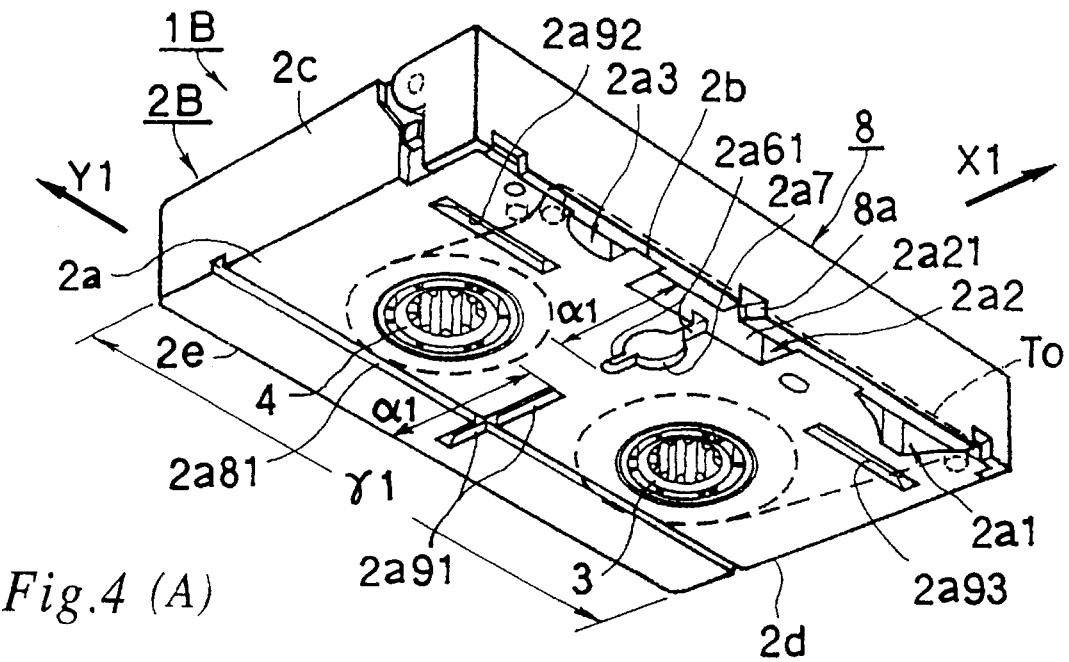
FIG. 4(A) is a perspective view of a VHS standard tape cassette (a tape cassette) illustrated from a bottom side thereof according to a first embodiment of the present invention.
FIG. 4(B) is a cross-sectional view of a first erroneous insertion preventing section and an escaping slot along the shorter side of the tape cassette.
FIG. 4(C) is a cross-sectional view of an escaping slot along the longer side of the tape cassette.
FIG. 4(D) is a partially enlarged view of the FIG. 4(C)
Figure 4:
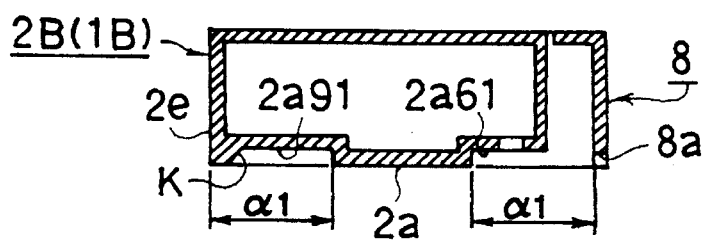
Figure 4:
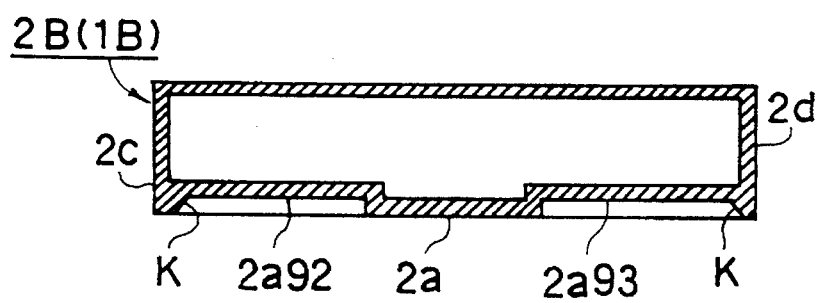
Figure 4:
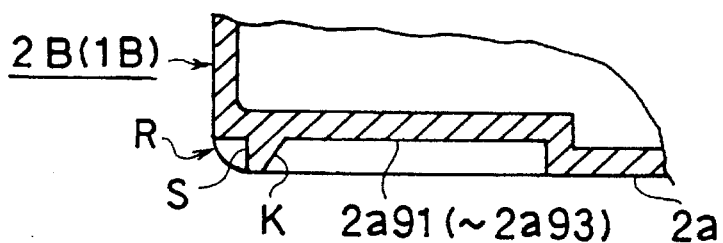
Figure 5:
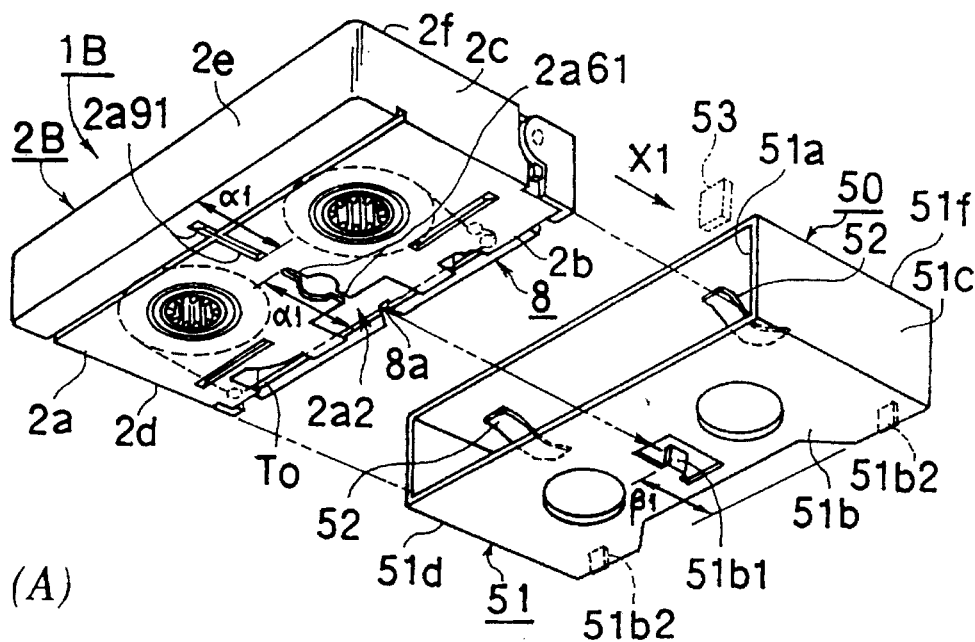
FIG. 5(A) is a perspective view for explaining erroneous insertion preventing operation of the tape cassette of the first embodiment, wherein the tape cassette is going to be inserted in a normal manner in the direction of an arrow X1 onto a cassette holder provided in the standard type VTR by causing a front lid of the tape cassette to be the head.
FIG. 5(B) is a cross-sectional view showing a state where the tape cassette is mounted on the cassette holder in a normal state.
FIG. 5(C) is a cross-sectional view showing a state where the tape cassette is erroneously inserted onto the cassette holder by causing the front lid of the tape cassette to be the rear and is prevented from being mounted on the cassette holder.
FIG. 5(D) is a cross-sectional view showing a state where the tape cassette is erroneously inserted onto the cassette holder by causing the front lid of the tape cassette to be the rear and the detecting member of the cassette holder is inserted into the escaping slot.
Figure 5:
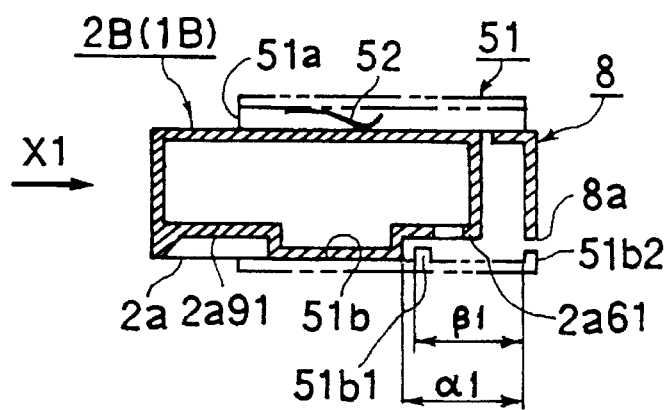
Figure 5:
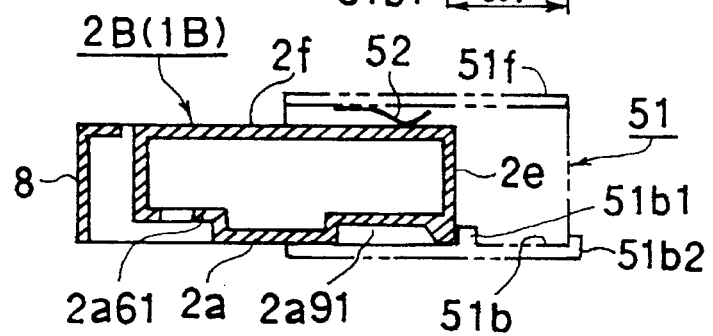
Figure 5:
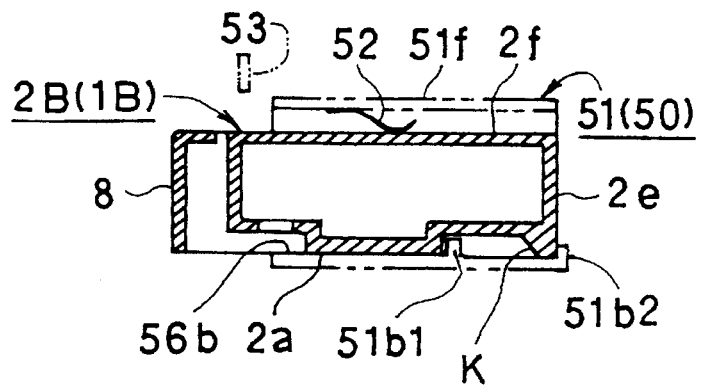
Figure 6:
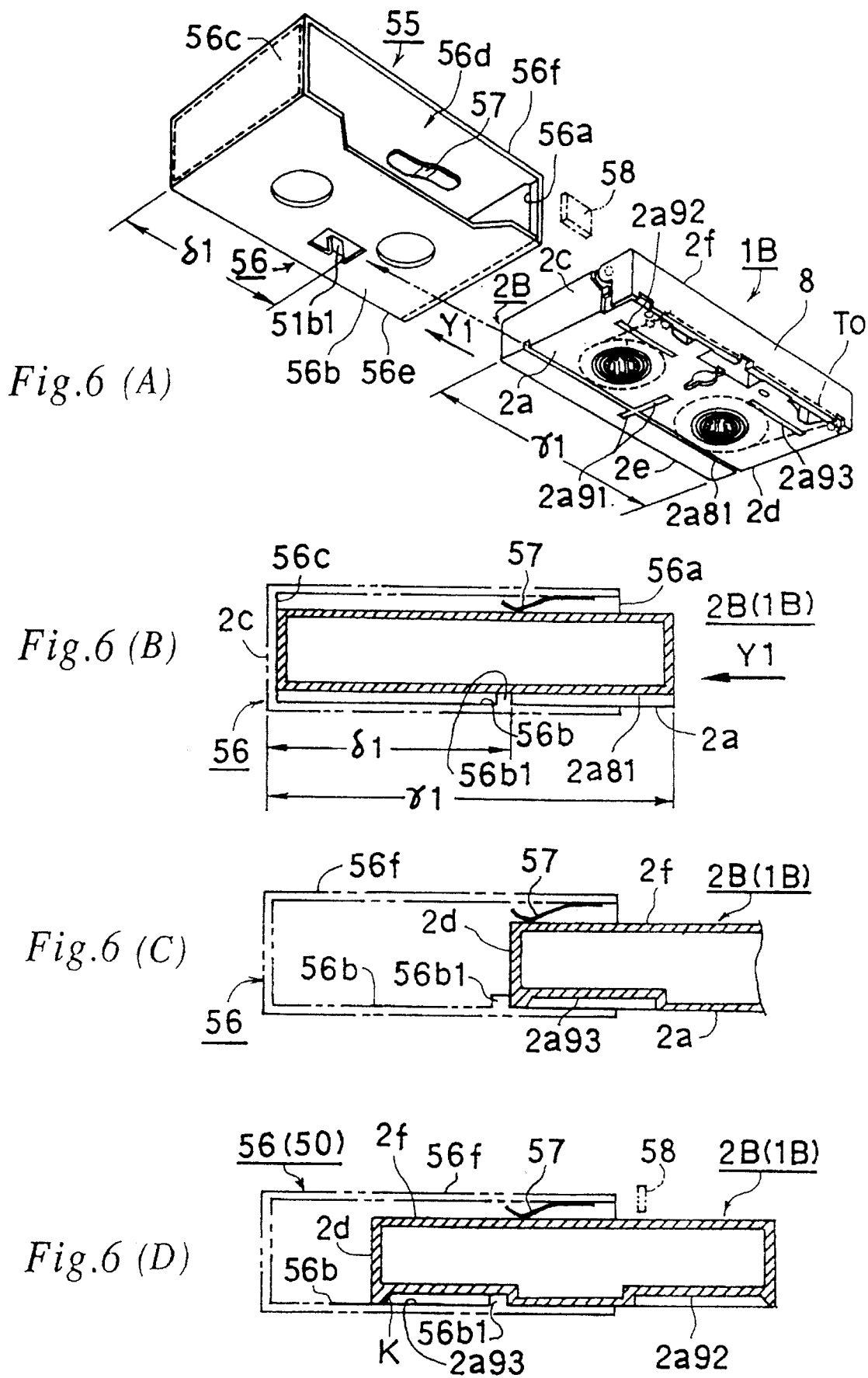
FIG. 6(A) is a perspective view for explaining erroneous insertion preventing operation of the tape cassette of the first embodiment, wherein the tape cassette is going to be inserted in a normal manner in the direction of an arrow Y1 onto a cassette holder provided in another standard type VTR by causing a predetermined side face having a shorter side of the tape cassette to be the head.
FIG. 6(B) is a cross-sectional view showing a state where the tape cassette is mounted on the cassette holder in a normal state.
FIG. 6(C) is a cross-sectional view showing a state where the tape cassette is erroneously inserted onto the cassette holder by causing the predetermined side face thereof to be the rear and is prevented from being mounted on the cassette holder.
FIG. 6(D) is a cross-sectional view showing a state where the tape cassette is erroneously inserted onto the cassette holder by causing the predetermined side face thereof to be the rear and the detecting member of the cassette holder is inserted into the escaping slot.

Next, as shown in FIGS. 6(A) and 6(B), when the tape cassette 1B is normally inserted onto the cassette holder 56 of the standard type VTR 55 by causing the predetermined side 2c thereof to be the front, the operation of the second erroneous insertion preventing section is the same as that of the tape cassette 1A in the prior art shown in FIGS. 3(A), 3(B), thus the description is omitted here.

Further, as sown in FIG. 6(C), when the tape cassette 1B is erroneously inserted onto the cassette holder 56 of the standard type VTR 55 by causing another side 2d thereof to be the head and by causing the tape cassette 1B to be parallel to the bottom of the cassette holder 56, the operation of the second erroneous insertion preventing section is the same as that of the tape cassette 1A in the prior art shown in FIG. 3(C), thus the description is also omitted here.

Further, in a state shown in FIG. 6(D), when the tape cassette 1B is erroneously inserted onto the cassette holder 56 in the direction as shown in FIG. 6(C), there is a slight clearance between the back face of the upper plate 56f of the cassette holder 56 and the upper surface 2f of the casing 2B because the height of the cassette holder 56 is higher than that of the casing 2B as mentioned in the foregoing. In this state, when the tape cassette 1B is inserted onto the cassette holder 56 by causing another side 2d to be the head and by causing the tape cassette 1B to be inclined upward forcibly, a wall of the front of another side 2d rides on the detecting member 56b1. When the tape cassette 1B is further forcibly inserted onto the cassette holder 56 by a user who is not conscious of it, the detecting member 56b1 is inserted into the escaping slot 2a93 after the wall of the front of another side 2d overrides the detecting member 56b1. As the length of the escaping slot 2a93 is formed long enough, the detecting member 56b1 is held to be inserted into the escaping slot 2a93. When the tape cassette 1B is further inserted onto the cassette holder 56, the distal end of the escaping slot 2a93 abuts on the detecting member 56b1. Thus, the tape cassette 1B is prevented from being fully inserted onto the cassette holder 56 till the predetermined position, from which the user is conscious of the erroneous insertion. Thus, the user can draw out the tape cassette 1B from the cassette holder 56. Incidentally, the tapered surface "K" is provided at the distal end of the escaping slot 2a93 on another side 2d, thus the tape cassette 1B can be easily drawn out from the cassette holder 56 along the tapered surface "K".

On the other hand, even when the user who is not conscious of his erroneous insertion further intends to fully insert the tape cassette 1B on the cassette holder 56 forcibly by causing the the side 2d to incline upward, his further insertion will be prevented because the casing 2B has been inserted in a fairly inner position of the cassette holder 56, thus, the upper portion of the side 2e of the casing 2B abuts on the bottom of the upper plate 56f of the cassette holder 56 or the upper plate 2f of the casing 2B abuts on an upper portion of the inlet 56a of the cassette holder 56 before the distal end of the escaping slot 2a93 rides on the detecting member 56b1 upon his further insertion.

As will be understood from the above description, the tape cassette 1B is securely retracted from the cassette holder 56 without the decomposition of the standard type VTR 55 or any damage of the tape cassette 1B even when the tape cassette 1B is erroneously inserted onto the cassette holder 56 by causing another side 2d having the shorter side thereof to be the head and by causing the tape cassette 1B to be inclined upward.

<Second Embodiment>

FIG. 7(A) is a perspective view of a W-VHS standard tape cassette (a tape cassette) illustrated from a bottom side thereof according to a second embodiment of the present invention;

FIG. 7(B) is a cross-sectional view of a first erroneous insertion preventing section and an escaping slot provided along a shorter side of the tape cassette;

FIG. 7(C) is a cross-sectional view of a second erroneous insertion preventing section along a longer side of the tape cassette; and FIG. 7(D) is a cross-sectional view of an escaping slot provided along the longer side of the tape cassette.

FIG. 8(A) is a perspective view for explaining erroneous insertion preventing operation of the tape cassette in the second embodiment, wherein the tape cassette is going to be inserted in a normal manner in the direction of an arrow X1 onto a cassette holder provided in the compatible type VTR by causing a front lid of the tape cassette to be the head; and FIG. 8(B) is a cross-sectional view showing a state where the tape cassette is mounted on the cassette holder in a normal state.

FIG. 9(A) is a cross-sectional view showing a state where the tape cassette of the second embodiment is erroneously inserted onto the cassette holder of the standard type VTB by causing the front lid of the tape cassette to be the head and is prevented from being mounted on the cassette holder; and FIG. 9(B) is a cross-sectional view showing a state where the tape cassette is erroneously inserted onto the cassette holder by causing the front lid of the tape cassette to be the head and the detecting member of the cassette holder is inserted into the escaping slot.

FIG. 10(A) is a perspective view for explaining erroneous insertion preventing operation of the tape cassette in the second embodiment, wherein the tape cassette is going to be inserted in a normal manner in the direction of an arrow Y1 onto a cassette holder provided in the compatible type VTB by causing a predetermined side face having a shorter side of the tape cassette to be the head; and FIG. 10(B) is a cross-sectional view showing a state where the tape cassette is mounted on the cassette holder in a normal state.

FIG. 11(A) is a cross-sectional view showing a state where the tape cassette of the second embodiment is erroneously inserted onto the cassette holder of the standard type VTB by causing the predetermined side face thereof to be the head and is prevented from being mounted on the cassette holder; and FIG. 11(B) is a cross-sectional view showing a state where the tape cassette is erroneously inserted onto the cassette holder by causing the predetermined side face thereof to be the head and the detecting member of the cassette holder is inserted into the escaping slot.

A W-VHS standard tape cassette 1C (referred to a tape cassette 1C hereinafter) of a second embodiment according to the present invention as shown in the FIGS. 7(A)–7(D) has a casing 2C (a second cassette casing) which is constructed to have approximately the same dimensions as the casing 2B (a first cassette casing) of the aforementioned tape cassette 1B in the first embodiment, thus the like parts are shown by corresponding reference characters through the several views of the drawings.

The tape cassette 1C of the second embodiment is equipped with a metal tape "Tm" (a second magnetic tape) made of a film base having a ½-in width, and is constructed for a high density recording use (a second recording format). The metal tape "Tm" is different from the aforementioned iron oxide tape (a first magnetic tape) "To" which has the ½-in width and is constructed as the standard recording tape cassette in conformity with the VHS standard format (a first recording format). The tape cassette 1C is adaptable to VTBs 60, 65 which are constructed in conformity with both the high recording density format such as a W-VHS format and the standard recording format such as the VHS format.

In the second embodiment, the tape cassette 1C has such constructional features as a length of an erroneous insertion preventing slot (referred to as a preventing slot) 2a62 of a first erroneous insertion preventing section and lengths of erroneous insertion preventing slots (referred to as preventing slots) 2a82, 2a83 of a second erroneous insertion preventing section provided on the bottom 2a of the casing 2C are respectively made shorter than those of the preventing slot 2a61 and the preventing slots 2a81 in the first embodiment, which prevents the tape cassette 1C to be erroneously inserted onto the standard type VTR (VHS) 50 or 55. Further the tape cassette 1C is provided with an escaping slots 2a94 just behind the preventing slot 2a62 and an escaping slot 2a95 between the preventing slots 2a82 and 2a83 so that the detecting members 51b1, 56b1 of the cassette holders 51, 56 are respectively inserted thereinto when the tape cassette 1C is erroneously and forcibly inserted thereonto as mentioned hereinafter.

Thus, the tape cassette 1C of the second embodiment is allowed to be inserted onto the compatible type VTRs (VHS, W-VHS) 60, 65 newly developed, while it is inhibited to be inserted onto the standard type VTR 50 or 55 by the first and second erroneous insertion preventing section (8a, 2a62), (2a82, 2a83) as mentioned hereinafter.

Moreover, as shown in FIGS. 7(A)–7(D), on the bottom 2a of the tape cassette 1C, there are provided with the same escaping slots 2a91–2a93 as described in the first embodiment, thus the description is omitted here. Needless to say, the escaping slots 2a91–2a93 are adaptable to the compatible VTRs (VHS, W-VHS) 60, 65 as well as the standard type VTRs 50, 51.

Figure 7:
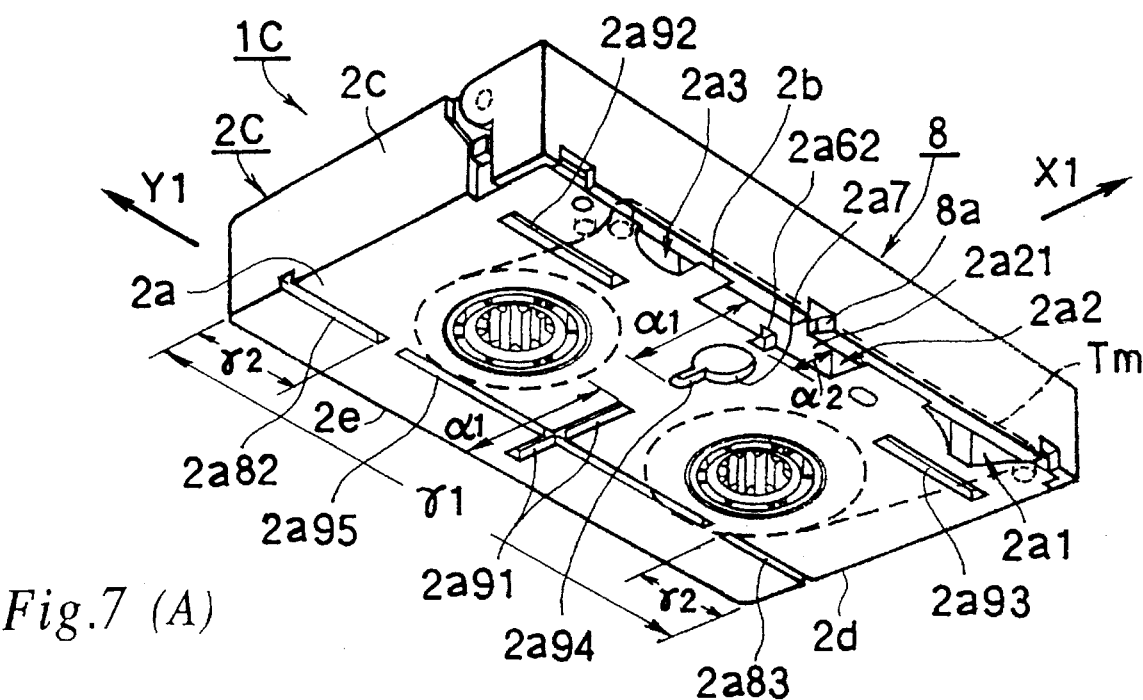
FIG. 7(A) is a perspective view of a W-VHS standard tape cassette (a tape cassette) illustrated from a bottom side thereof according to a second embodiment of the present invention.
FIG. 7(B) is a cross-sectional view of a first erroneous insertion preventing section and an escaping slot provided along a shorter side of the tape cassette.
FIG. 7(C) is a cross-sectional view of a second erroneous insertion preventing section along a longer side of the tape cassette.
FIG. 7(D) is a cross-sectional view of an escaping slot provided along the longer side of the tape cassette.
Figure 7:
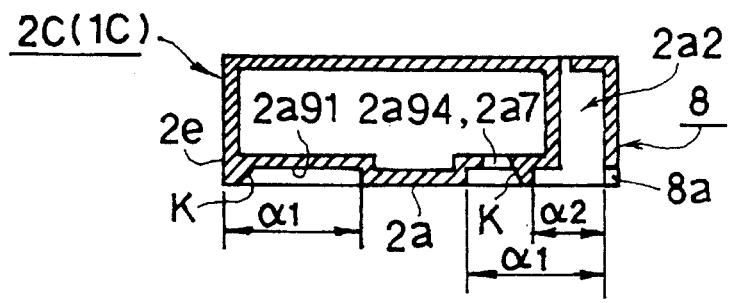
Figure 7:
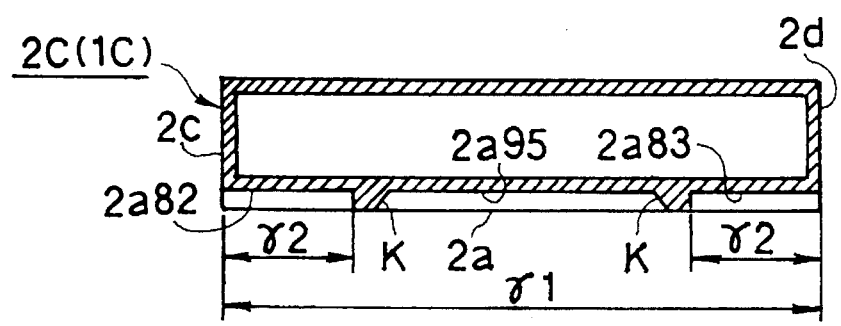
Figure 7:
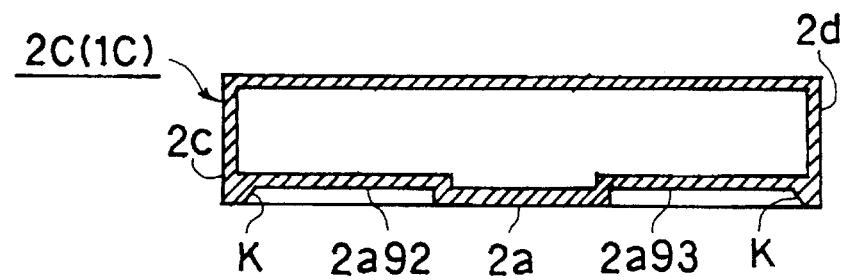
Figure 8:
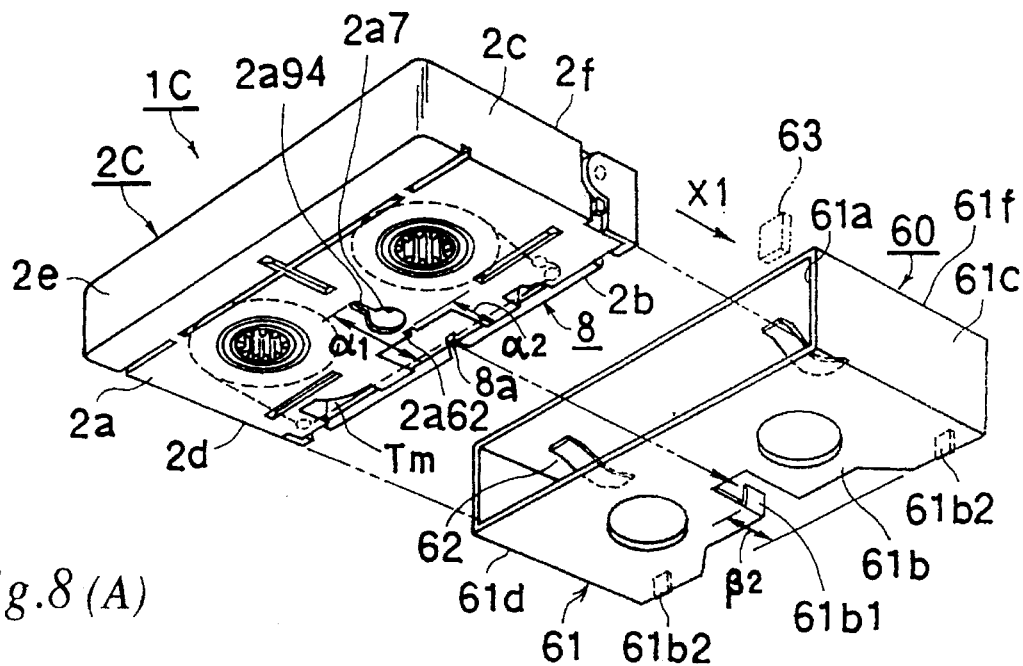
FIG. 8(A) is a perspective view for explaining erroneous insertion preventing operation of the tape cassette in the second embodiment, wherein the tape cassette is going to be inserted in a normal manner in the direction of an arrow X1 onto a cassette holder provided in a compatible type VTR by causing a front lid of the tape cassette to be the head.
FIG. 8(B) is a cross-sectional view showing a state where the tape cassette is mounted on the cassette holder in a normal state.
Figure 8:
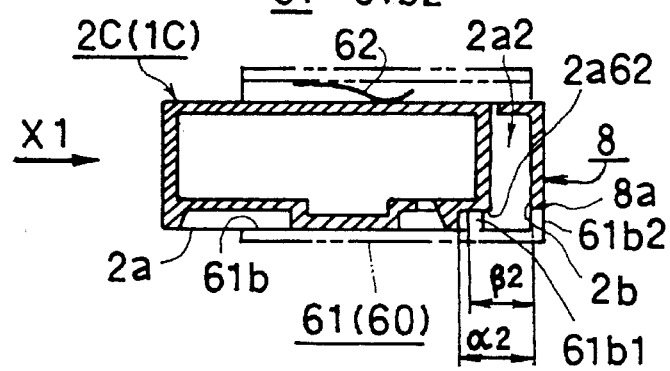
Figure 9:
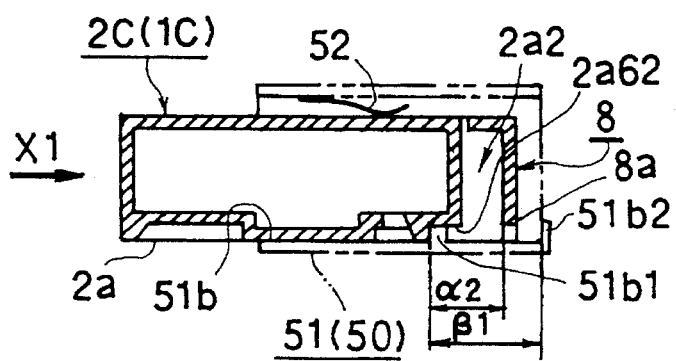
FIG. 9(A) is a cross-sectional view showing a state where the tape cassette of the second embodiment is erroneously inserted onto the cassette holder of the standard type VTR by causing the front lid of the tape cassette to be the head and is prevented from being mounted on the cassette holder.
FIG. 9(B) is a cross-sectional view showing a state where the tape cassette is erroneously inserted onto the cassette holder by causing the front lid of the tape cassette to be the head and the detecting member of the cassette holder is inserted into the escaping slot.
Figure 9:
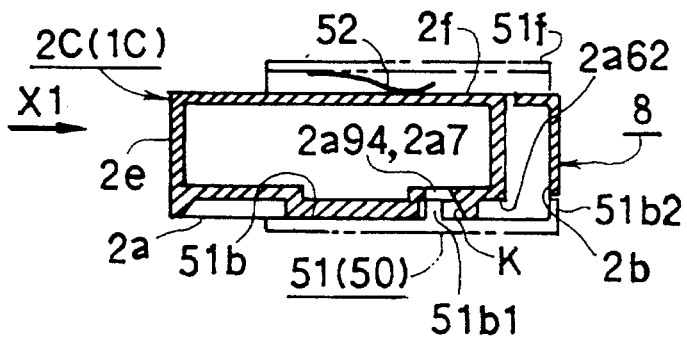
Figure 10:
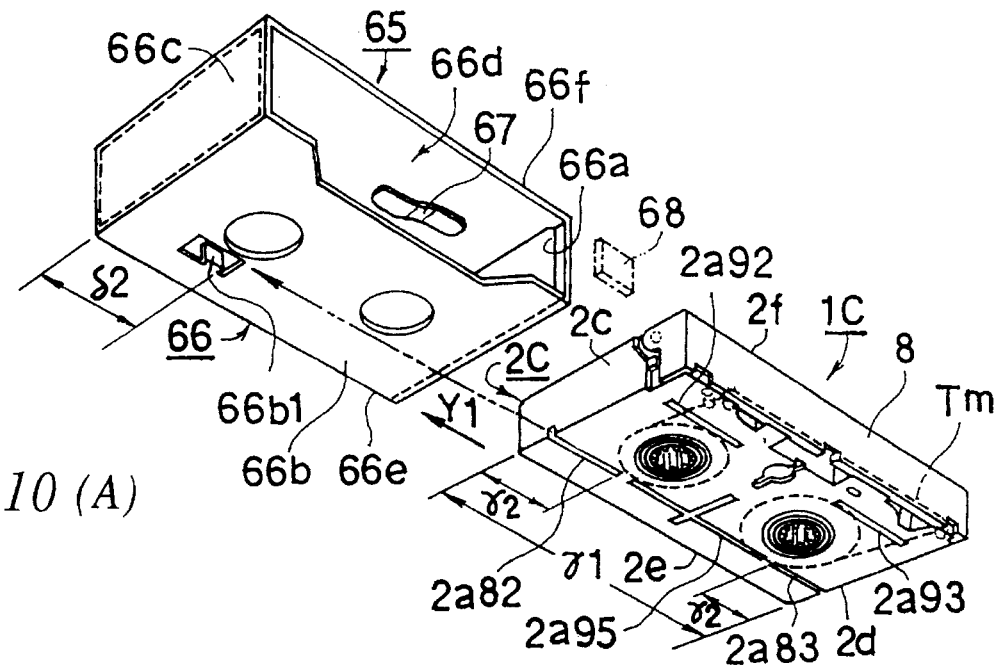
FIG. 10(A) is a perspective view for explaining erroneous insertion preventing operation of the tape cassette in the second embodiment, wherein the tape cassette is going to be inserted in a normal manner in the direction of an arrow Y1 onto a cassette holder provided in the compatible type VTR by causing a predetermined side face having a shorter side of the tape cassette to be the head.
FIG. 10(B) is a cross-sectional view showing a state where the tape cassette is mounted on the cassette holder in a normal state.
Figure 10:
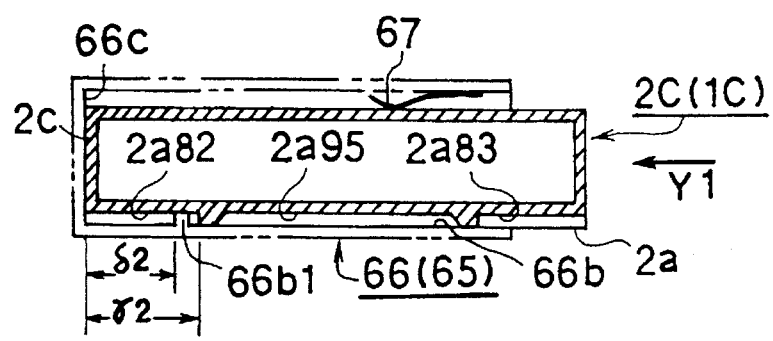
Figure 11:
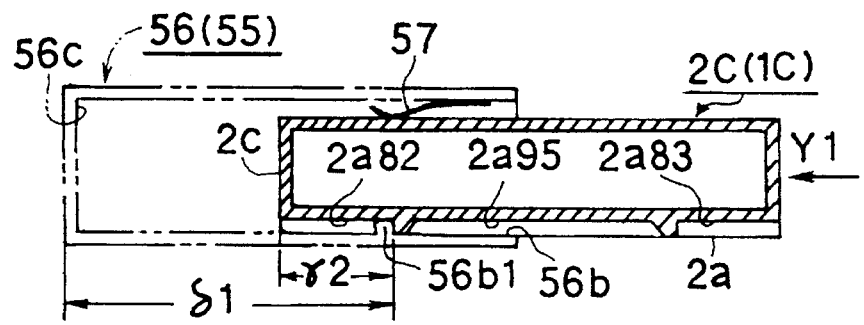
FIG. 11(A) is a cross-sectional view showing a state where the tape cassette of the second embodiment is erroneously inserted onto the cassette holder of the standard type VTR by causing the predetermined side face thereof to be the head and is prevented from being mounted on the cassette holder.
FIG. 11(B) is a cross-sectional view showing a state where the tape cassette is erroneously inserted onto the cassette holder by causing the predetermined side face thereof to be the head and the detecting member of the cassette holder is inserted into the escaping slot.
Figure 11:
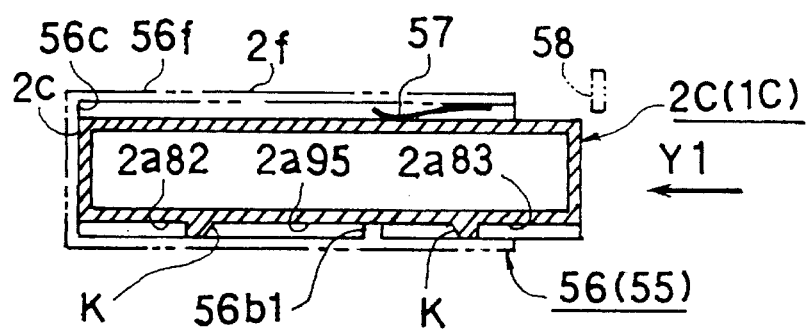
Figure 12:
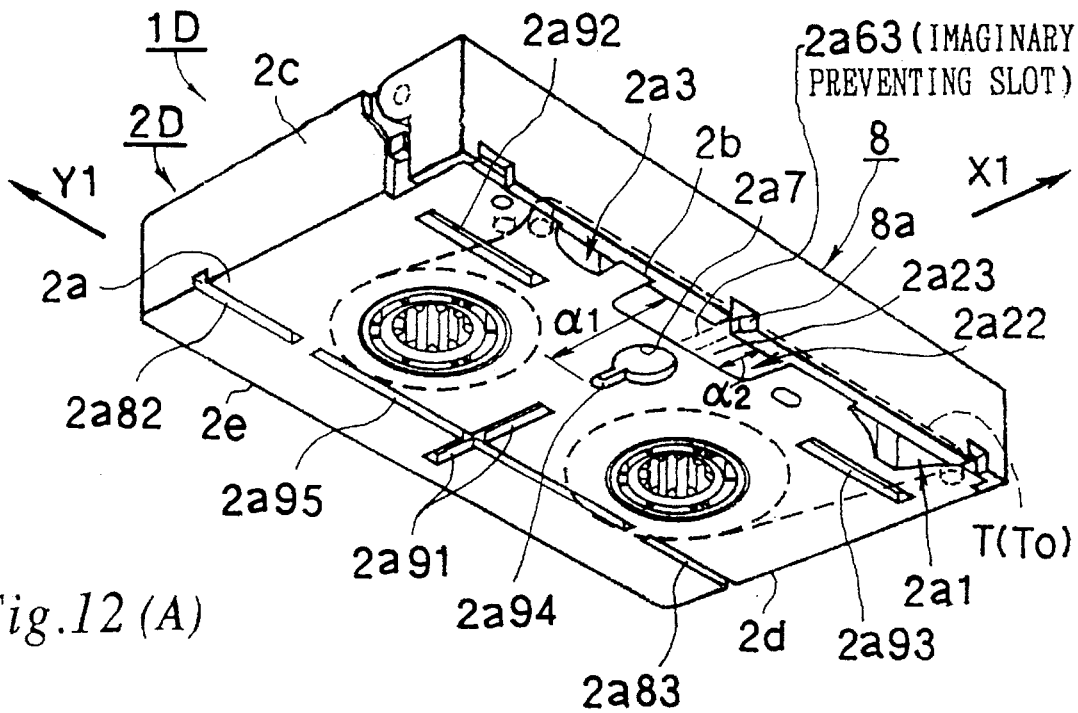
FIG. 12(A) is a perspective view of a tape cassette illustrated from a bottom side thereof according to a third embodiment of the present invention.
FIG. 12(B) is a cross-sectional view showing a state where the tape cassette is mounted on the cassette holder of the compatible type VTR in a normal state by causing the front lid having the longer side to be the head.
Figure 12:
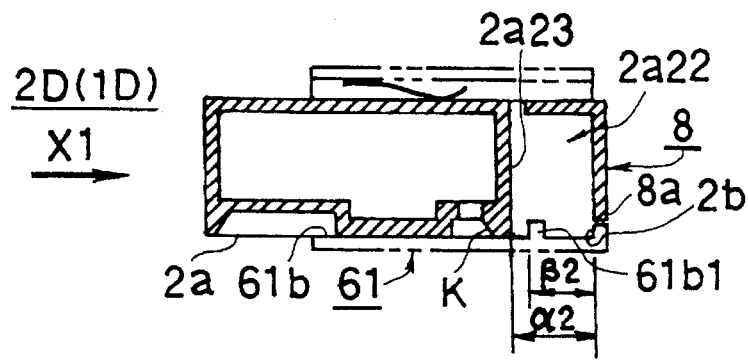
Figure 13:
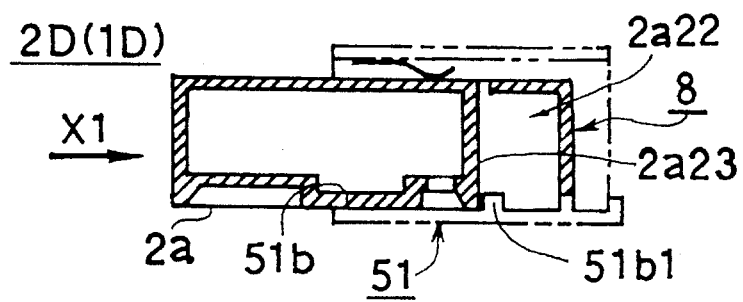
FIG. 13(A) is a cross-sectional view showing a state where the tape cassette is erroneously inserted onto the cassette holder of the standard type VTR by causing the front lid of the tape cassette to be the head and is prevented from being mounted on the cassette holder.
FIG. 13(B) is a cross-sectional view showing a state where the tape cassette is erroneously inserted onto the cassette holder by causing the front lid of the tape cassette to be the head and the detecting member of the cassette holder of the standard type VTR is inserted into the escaping slot.
Figure 13:
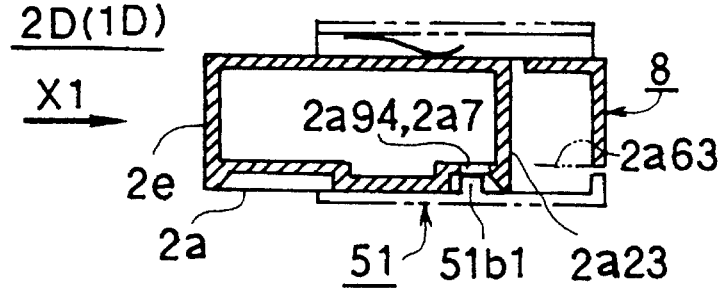
Figure 14:
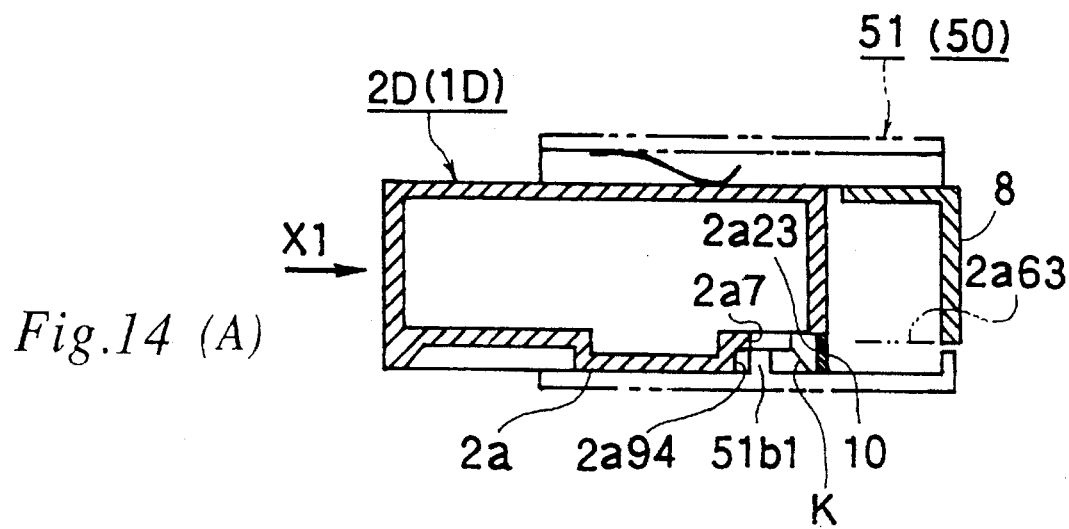
FIG. 14(A) is a cross-sectional view for explaining a reinforced member provided in a recess formed at a front wall of the central loading pocket.
FIG. 14(B) is a cross-sectional view for explaining a reinforced member provided in a recess formed by removing the front wall of the central loading pocket.
FIG. 14(C) is a cross-sectional view for explaining a reinforced member provided in a recess formed by removing the front wall of the loading pocket.
Figure 14:
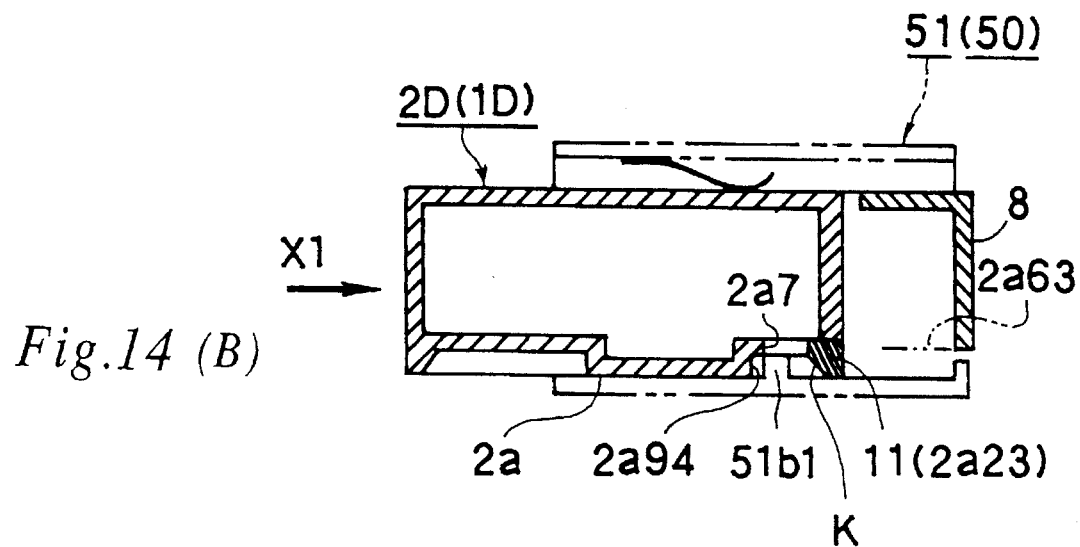
Figure 14:
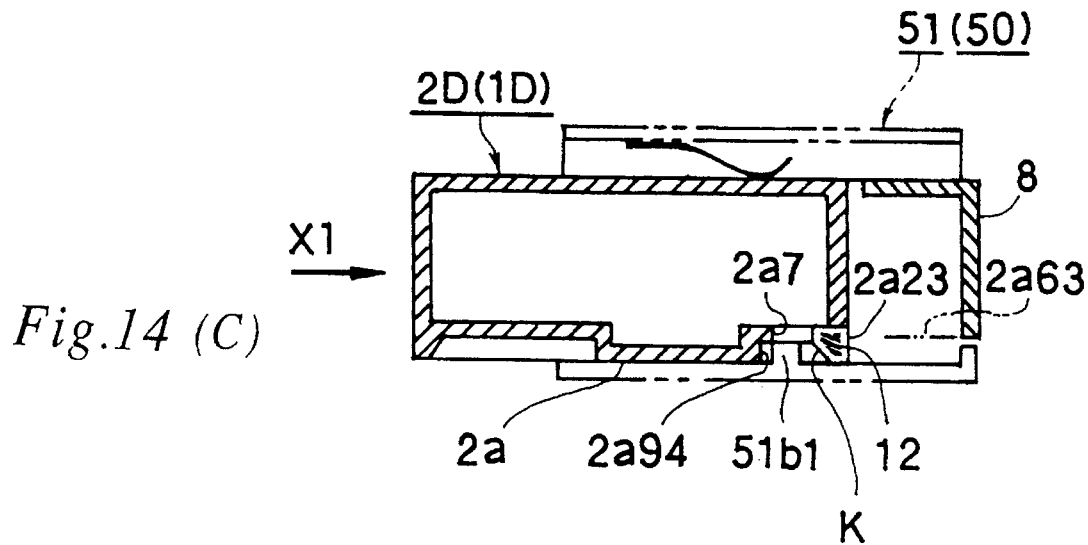
Figure 15:
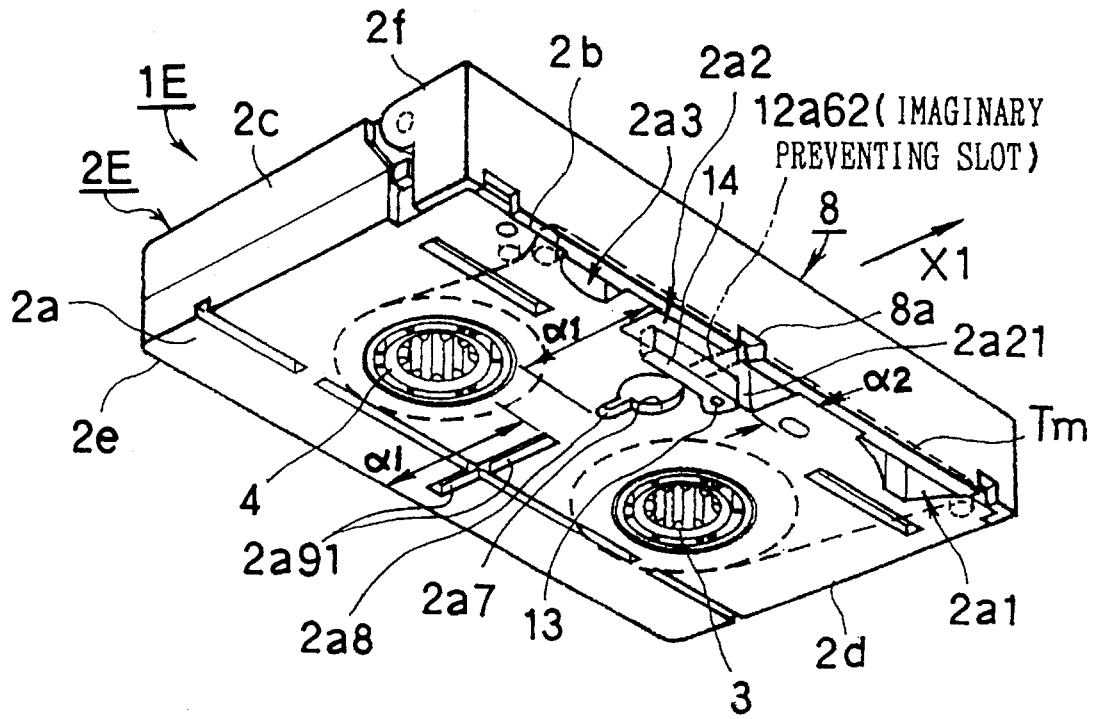
FIG. 15(A) is a perspective view of a W-VHS standard tape cassette (a tape cassette) illustrated from a bottom side thereof according to a forth embodiment of the present invention.
FIG. 15(B) is a cross-sectional view of an erroneous insertion preventing section and an escaping slot provided along a shorter side of the tape cassette.
Figure 15:
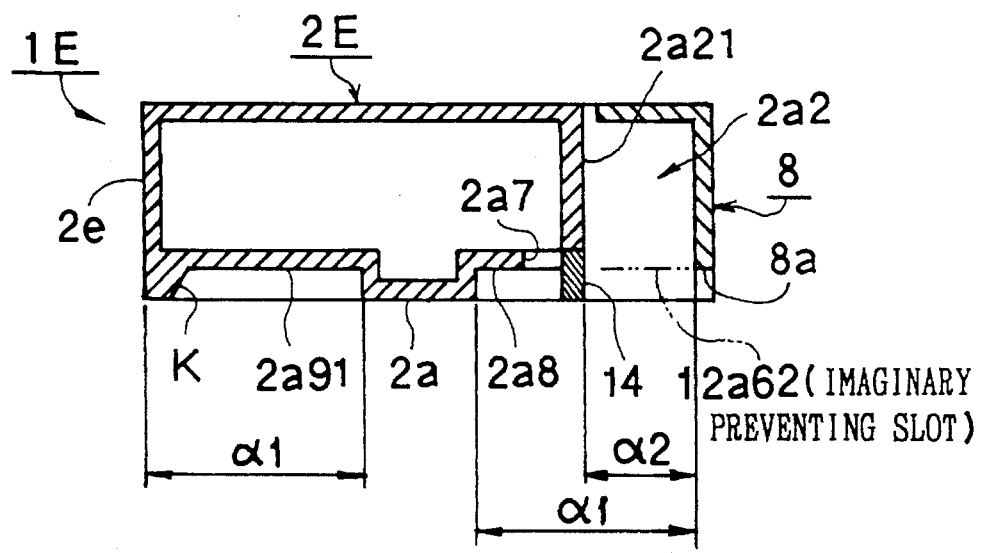
Figure 17:
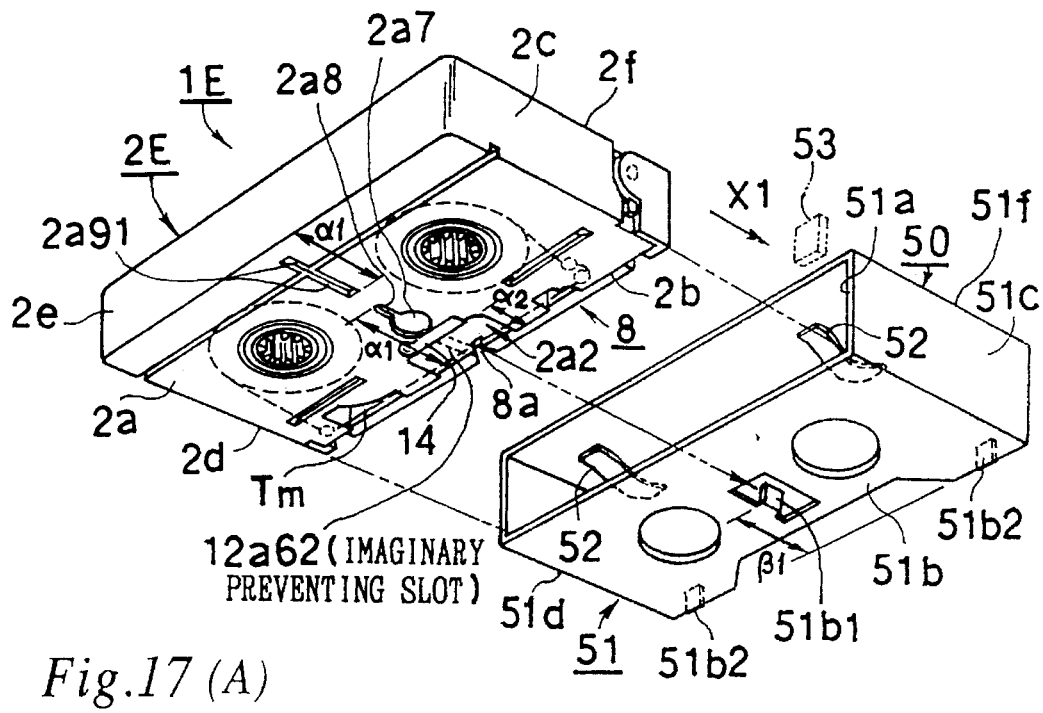
FIG. 17(A) is a perspective view for explaining erroneous insertion preventing operation of the tape cassette in the forth embodiment, wherein the tape cassette is going to be inserted in a normal manner in the direction of an arrow X1 onto a cassette holder provided in the standard type VTR by causing a front lid of the tape cassette to be the head.
FIG. 17(B) is a cross-sectional view showing a state where the tape cassette of the forth embodiment is erroneously inserted onto the cassette holder of the standard type VTR by causing the front lid of the tape cassette to be the head and is prevented from being mounted on the cassette holder.
FIG. 17(C) is a cross-sectional view showing a state where the tape cassette is erroneously inserted onto the cassette holder thereof by causing the front lid of the tape cassette to be the head and the detecting member of the cassette holder is finally inserted into the escaping slot.
Figure 17:
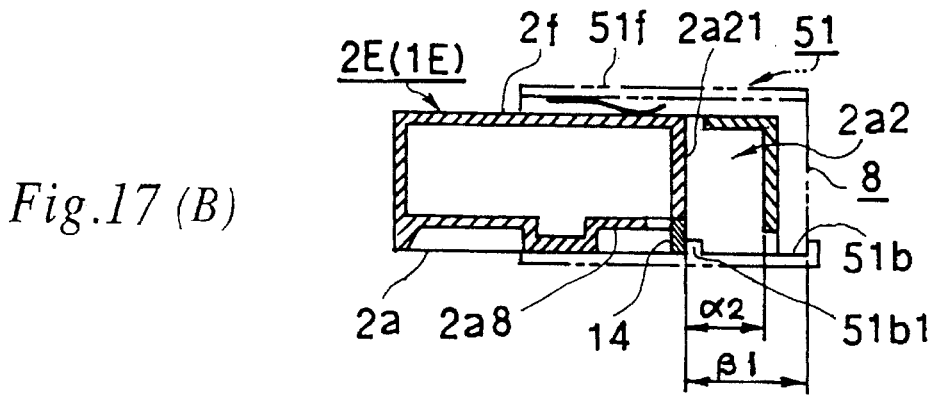
Figure 17:
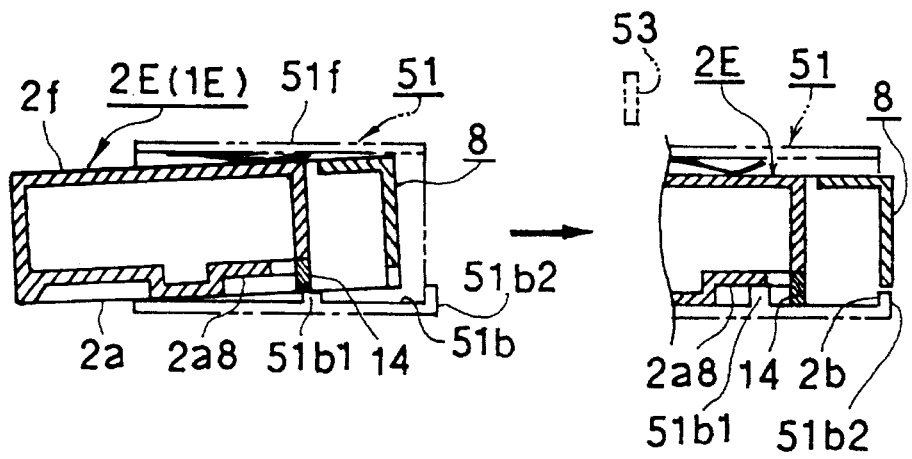
Figure 18:
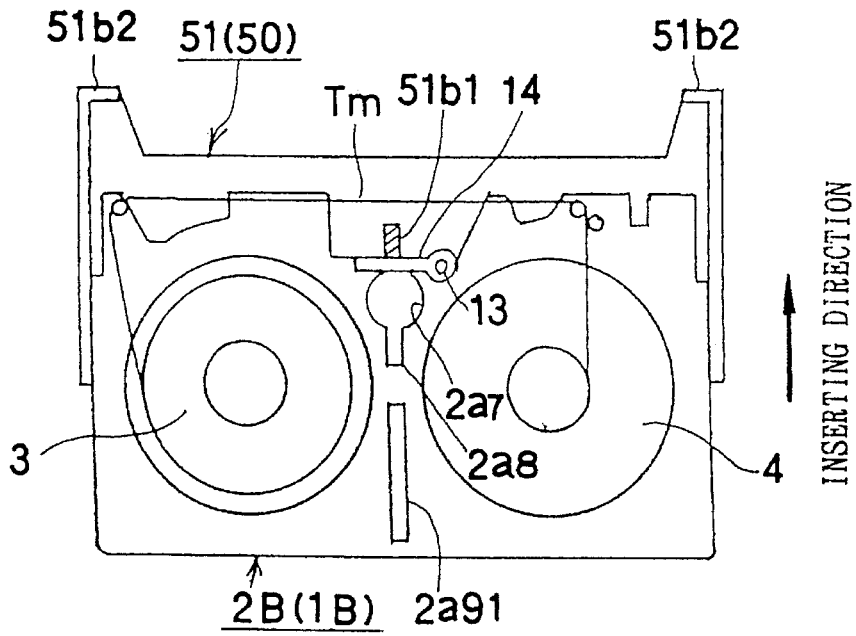
FIG. 18(A) is a plan view for explaining an erroneous insertion of the tape cassette on the cassette holder of the standard type VTR by causing the front lid to be the head, wherein the tape cassette is prevented from the erroneous insertion.
FIG. 18(B) is a plan view for explaining an erroneous insertion of the tape cassette on the cassette holder of the standard type VTR by causing the front lid to be the head, wherein the detecting member of the cassette holder is inserted into the preventing slot by overriding a preventing door provided at a front wall of the central loading pocket.
FIG. 18(C) is a plan view for explaining an erroneous insertion on the cassette holder of the standard type VTR by causing the front lid to be the head, wherein the detecting member opens the preventing door with ejecting operation of the tape cassette.
Figure 18:
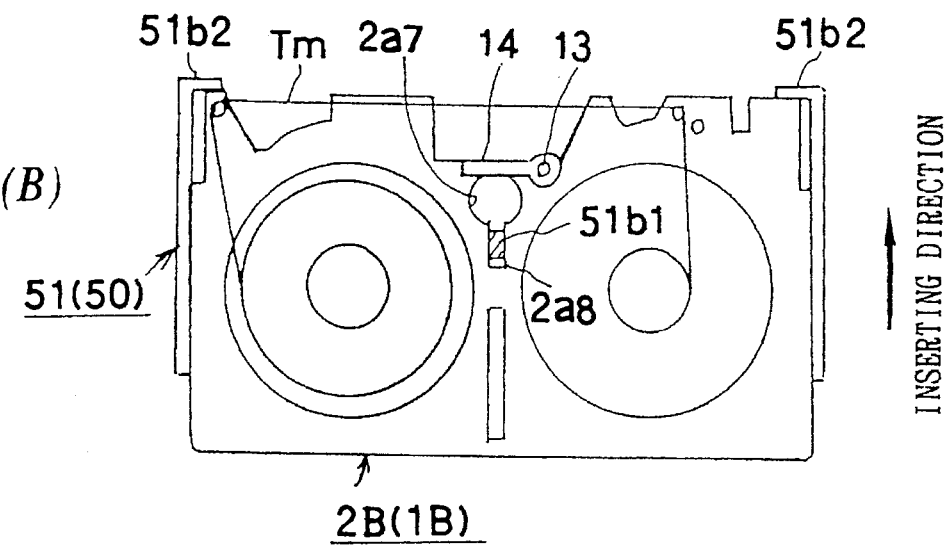
Figure 18:
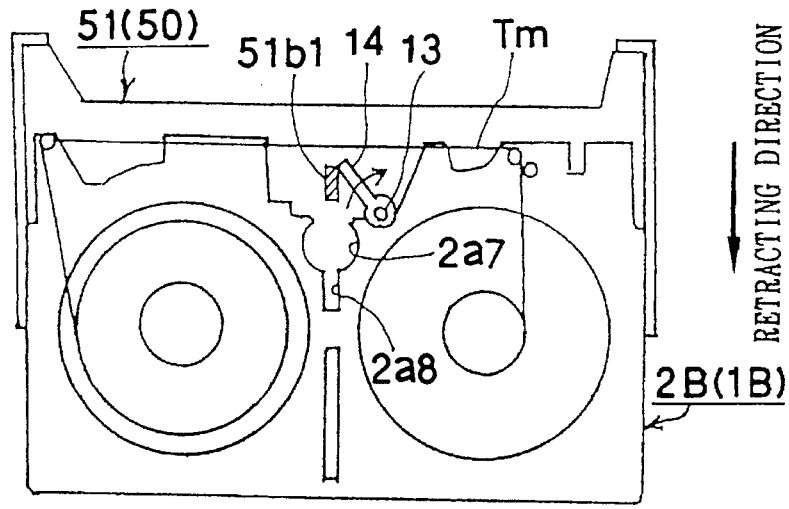

Next, referring to FIGS. 7(A), 7(8) and 8(A), the first erroneous insertion preventing section for allowing a normal insertion of the tape cassette 1C onto the compatible type VTR 60 by causing the front lid 8 to be the head comprises a cutout 8a shallowly provided approximately at a center of the lower edge of a front lid 8 and an erroneous insertion preventing slot (referred to as a preventing slot hereinafter) 2a62 shallowly provided on the bottom 2a of the casing 2C caused by being disposed in line with respect to the cutout 8a of the front lid 8. The preventing slot 2a62 is formed just behind the central loading pocket 2a2 staring from a front wall 2a21 of the the loading pocket 2a2 which is formed at a front center of the bottom 2a thereof.

Incidentally, a position of the preventing slot 2a62 in the direction of the width is the same as that of the first embodiment and a distance from the front 2b of the casing 2C to an distal end of the preventing slot 2a62 is determined at a length of $\alpha 2$ mm which is shorter than the length of $\alpha 1$ mm in the first embodiment as shown in FIG. 1(B).

Further, just behind the preventing slot 2a62, a escaping slot 2a94, which is one of the main parts of the second embodiment, is formed along an extended line of the preventing slot 2a62.

This escaping slot 2a94 is provided to allow the erroneous insertion of the tape cassette 1C onto the standard type VTR 50 by causing the front lid 8 to be the head and to be inclined upward forcibly, that is, after the distal end of the preventing slot 2a62 overrides the detecting member 51b1, the detecting member 51b1 is inserted into the escaping slot 2a94 by the the further forcible insertion of the tape cassette 1C, which allows the erroneous insertion thereof.

The escaping slot 2a94 is shallowly and straightly formed in a concave shape on the bottom 2a of the casing 2C so as to include the lamp inserting hole 2a7 at an distal end thereof for allowing the inserting of the lamp (not shown) as mentioned in the foregoing. A length from the front 2b of the casing 2C to the innermost distal end of the escaping slot 2a94 is made longer than the length of $\alpha 1$ mm.

Further, at the front wall of the lamp inserting hole 2a7, there is provided a tapered surface "K" so that the detecting member 51b1 inserted in the escaping slot 2a94 can easily escape therefrom.

On the other hand, as shown in FIGS. 8(A), in the compatible type VTR 60, where the tape cassette 1C is inserted thereonto by causing the front lid 8 to be the head, a cassette inlet 61a is formed largely in a cassette holder 61 correspondingly with the longer side of the casing 2C and the height of the cassette inlet 61a is made higher than that of the casing 2C so that the leaf springs 62, 62 press the upper surface 2f of the tape cassette 1C inserted thereonto. Further, an eject button 63 is provided nearby the cassette inlet 61a.

Moreover, an erroneous insertion preventing detecting measure (referred to as a detecting member) 61b1 protrudes upward from the bottom plate 61b of the cassette holder 61 by being bent upward to engage with the first insertion preventing section (8a, 2a62). Further in the cassette holder 61, there are provided a pair of stoppers 61b2, 61b2 at an distal end of the bottom 61b thereof by being bent upward and separated at a predetermined distance in the direction of the longer side. Incidentally, the position of the detecting member 61b1 in the direction of the longer side is the same as that of prior art shown in FIG. 2(A) and a distance from the detecting member 61b1 to an extending line of the stoppers 51b2, 51b2 in the direction of the shorter side is determined at a length of $\beta 2$ mm which is slightly smaller than the aforementioned length of $\alpha 2$ mm. Thus, it will be understood that the detecting member 61b1 of the second embodiment is positioned more inward in the cassette holder 61 than that of the preventing member 51b1 in the prior art.

Referring to FIGS. 8(A), 8(B), the tape cassette 1C is inserted into the cassette holder 61 of the compatible type VTR 60 from the inlet 61a by causing the front lid 8 to be the head so as to be mounted on the bottom 61b thereof. With the insertion of the tape cassette 1C, the casing 2C is restricted and guided by the inlet 61a and inner side faces 61c. 61d of the cassette holder 61 by causing both sides 2c, 2d of the casing 2C to contact the inner side faces 61c, 61d of the cassette holder 61, so that the detecting member 61b1 provided on the inner position of the cassette holder 61 is inserted into and passed by the cutout 8a of the front lid 8, the central loading pocket 2a2 and the preventing slot 2a62 of the casing 2C in this order. The length of $\alpha 2$ mm is larger than the length of $\beta 2$ mm as mentioned in the foregoing, thus the tape cassette 1C is fully inserted in the cassette holder 61 until the front 2b of the casing 2C abuts on the stoppers 61b2, 61b2 without abutting of the distal end of the preventing slot 2a62 on the detecting member 61b1, from which it is known that the tape cassette 1C is normally inserted onto the cassette holder 61.

On the other hand, as shown in FIG. 9(A), when the tape cassette 1C is inserted onto the cassette holder 51 of the standard type VTR 50 by causing the front lid 8 of the tape cassette 1C to be the head and by causing the tape cassette 1C to be parallel to the bottom 51b of the cassette holder 51, the detecting member 51b1 provided on the inner position of the cassette holder 51 is inserted into and passed by the cutout 8a of the front lid 8, the central loading pocket 2a2 and the preventing slot 2a62 of the casing 2C in this order until the distal end of the preventing slot 2a62 abuts on the detecting member 51b1. As the length of $\beta 1$ mm from the the detecting member 51b1 to the extended line of stoppers 5162, 5162 in the direction of the shorter side is larger than the length of $\alpha 1$ mm of the preventing slot 2a62, the distal end of the preventing slot 2a62 abuts on the detecting member 51b1 of the cassette holder 51, so that the tape cassette 1C is not completely inserted onto the cassette holder 51 leaving a part of the casing 2C outside, from which it is known that the tape cassette 1C is erroneously inserted onto the cassette holder 51.

Further, in a state shown in FIG. 9(B), when the tape cassette 1C is erroneously inserted onto the cassette holder 51 in the same direction as shown in FIG. 9(A), there is a slight clearance between the back face of the upper plate 51f of the cassette holder 51 and the upper surface 2f of the casing 2C because the height of the cassette holder 51 is higher than that of the casing 2C as mentioned in the foregoing. In this state, when the tape cassette 1C is inserted onto the cassette holder 51 by causing the front lid 8 to be the head and by causing the tape cassette 1C to be inclined upward carelessly, the distal end portion of the preventing slot 2a62 overrides the detecting member 51b1. When the tape cassette 1C is further forcibly inserted onto the cassette holder 51 by a user who is not conscious of it, the detecting member 51b1 is inserted into the escaping slot 2a94 including the lamp inserting hole 2a7 provided just behind the distal end of the preventing slot 2a62. As the length of the escaping slot 2a94 from the front 2b of the casing 2C to the distal end of the escaping slot 2a94 is formed more than the length of $\alpha 1$ mm, the the detecting member 51b remains within the escaping slot 2a94 without abutting on the distal end thereof until the the front 2b of the casing 2C abuts on the stoppers 51b2, 51b2. Thus, the tape cassette 1C is fully inserted into the cassette holder 51 in the erroneous state.

After that, the tape cassette 1C is transferred to the cassette holding position downward by the cassette holder 51. On the way, the lid 8 of the tape cassette 1C is opened by the lid opening mechanism (not shown), and the metal tape "Tm" is drawn out from the tape cassette 1C to be wound around the rotary drum (not shown). As disclosed in the Japanese Utility Model Laid-open Publication No. 5-14391/1993, recording signals can not be recorded on the metal tape by using the standard type VTR 50, however, the contents recorded on the metal tape may be reproduced thereby though it may be very poor picture quality because of differences of the recording format and magnetic characteristics of the magnetic tape, from which the user is conscious of the erroneous insertion. Thus, eject mode will be established by the user who pushes the eject button 53 of the standard type VTR 50. Incidentally, as the tapered surface "K" is provided at the distal end of the escaping slot 2a94 in which the detecting member 51b1 is inserted, the tape cassette 1C can be easily drawn out from the cassette holder 51 along the tapered surface "K" by the user. Thus, the tape cassette 1C is securely retracted from the cassette holder 51 without the decomposition of the standard type VTR 50 or any damage of the tape cassette 1C.

Next, as shown in FIGS. 7(A), 7(C) and 10(A), the second erroneous insertion preventing section for allowing a normal insertion of the tape cassette 1C onto the compatible type VTR 65 in the direction of an arrow Y1 by causing the predetermined side 2c having the shorter side to be the head comprises a pair of erroneous insertion preventing slots (referred to as preventing slots hereinafter) 2a82, 2a83, each stating from the sides 2c, 2d of the casing 2C and having a length of $\gamma 2$ mm shallowly and straightly provided on the bottom 2a of the casing 2C along a line parallel to the longer side and being deviated to the rear side 2e from a center line of the shorter side.

Incidentally, the positions of the preventing slots 2a82, 2a83 in the direction of the width of the shorter side, that is, the position of the above line parallel to the longer side, are the same as that of the preventing slot 2a81 of the prior art shown in FIG. 1(B) and the length of $\gamma 2$ mm thereof is smaller than the length of $\gamma 1$ mm of the preventing slot 2a81 of the prior art.

Further, an escaping slot 2a95, which is one of the main parts of the second embodiment, interposed between the distal ends of the pair of preventing slots 2a82, 2a83, is shallowly and straightly formed in a concave shape along an extended line of the preventing slots 2a82, 2a83.

The escaping slot 2a95 is provided for allowing the erroneous insertion of the tape cassette 1C onto the standard type VTR 55 by causing one of the sides 2c, 2d having shorter sides to be the head and by causing the tape cassette 1C to be inclined upward forcibly, that is, after the distal end of the preventing slot 2a82 overrides the detecting member 56b1 of the cassette holder 56, the detecting member 56b1 is inserted into the escaping slot 2a95 by the further forcible insertion of the tape cassette 1C, which allows the erroneous insertion thereof as described hereinafter.

Further, at both the distal ends of the escaping slot 2a95, there are provided tapered surfaces "K" so that the detecting member 56b1 inserted in the escaping slot 2a95 can easily escape therefrom.

On the other hand, as shown in FIGS. 10(A), in the compatible type VTR 65, where the tape cassette 1C is inserted by causing the side 2c having the shorter side to be the head, a cassette inlet 66a is formed smaller in a cassette holder 66 correspondingly with the shorter side of the casing 2C and the height of the cassette inlet 66a is made higher than that of the casing 2C so that the leaf spring 67 presses the upper surface 2f of the tape cassette 1C inserted thereon. Further, an eject button 68 is provided nearby the cassette inlet 66a of the cassette holder 66.

Moreover, an erroneous insertion preventing detecting measure (referred to as a detecting member) 66b1 protrudes upward from the bottom 66b of the cassette holder 66 by being bent upward to engage with the preventing slot 2a82. Further in the cassette holder 66, there are provided a stopper surface 66c at an innermost of the cassette holder 66.

Incidentally, the position of the detecting member 66b1 in the direction of the shorter side is the same as that of detecting member 56b1 of the prior art shown in FIG. 2(A) and a distance from the stopper surface 66c to the distal end of the preventing slot 2a82 is made a length of $\delta 2$ mm which is slightly smaller than the aforementioned length of $\delta 1$ mm from the stopper surface 86c to the detecting member 56b1 in the prior art as shown in FIG. 3(A) and is smaller than the aforementioned length of $\gamma 2$ mm of the preventing slot 2a82. Thus, it will be understood that the detecting member 66b1 of the second embodiment is positioned more inward in the cassette holder 66 than that of the detecting member 56b1 in the prior art.

Referring to FIGS. 10(A), 10(B), the tape cassette 1C is inserted into the cassette holder 66 of the compatible type VTB 65 from the inlet 66a by causing the side 2c having the shorter side be the head so as to be mounted on the bottom 66b thereof. With the insertion of the tape cassette 1C, the detecting member 66b1 provided on the inner position of the cassette holder 66 is inserted into the preventing slot 2a82 of the casing 2C. The length of $\gamma 2$ mm is larger than the length of $\delta 2$ mm as mentioned in the foregoing, thus the tape cassette 1C is fully inserted in the cassette holder 66 until the side 2c of the casing 2C abuts on the stopper surface 66c without abutting of the distal end of the preventing slot 2a82 on the detecting member 66b1, from which it is known that the tape cassette 1C is normally inserted onto the cassette holder 66.

On the other hand, as shown in FIG. 11(A), when the tape cassette 1C is inserted onto the cassette holder 56 of the standard type VTB 55 by causing the side 2c having the shorter side to be the head and by causing the tape cassette 1C to be parallel to the bottom 56b of the cassette holder 56, the detecting member 56b1 of the cassette holder 56 is inserted into the left-hand preventing slot 2a82 of the second erroneous preventing section, and the detecting member 56b1 abuts on the distal end of the preventing slot 2a82 as the length of $\delta 1$ mm from the stopper surface 56c to the distal end of the detecting member 56b1 is larger than the length of $\gamma 2$ mm of the preventing slot 2a82. Thus the tape cassette 1C is not inserted into the cassette holder 56 any more, from which the user is conscious of the erroneous insertion that the tape cassette 1C is erroneously inserted onto the cassette holder 56 of the standard type VTR.

Further, in a state shown in FIG. 11(B), when the tape cassette 1C is erroneously inserted onto the cassette holder 56 of the standard type VTR 55 in the same direction as shown in FIG. 11(A), there is a slight clearance between the back face of the upper plate 56f of the cassette holder 56 and the upper surface 2f of the casing 2C because the height of the cassette holder 56 is higher than that of the casing 2C as mentioned in the foregoing. In this state, when the tape cassette 1C is further inserted onto the cassette holder 56 of the standard type VTB 55 by causing the side 2c having the shorter side to be the head and by causing the tape cassette 1C to be inclined upward forcibly, the distal end portion of the escaping slot 2a82 overrides the detecting member 56b1. When the tape cassette 1C is further forcibly inserted onto the cassette holder 56 by a user who is not conscious of it, the detecting member 56b1 being inserted into the escaping slot 2a95 by riding over the wall of the preventing slot 2a82, the tape cassette 1C is inserted into the cassette holder 56 until the side 2c of the casing 2C abuts on the stopper surface 56c of the cassette holder 56 in the erroneous state.

After that, the tape cassette 1C is transferred to the cassette holding position downward by the cassette holder 56. On the way the lid 8 of the tape cassette 1C is opened by the lid opening mechanism (not shown). At the cassette holding position, the metal tape "Tm" is drawn out from the tape cassette 1C to be wound around the rotary drum (not shown). As disclosed in the Japanese Utility Model Publication No. 5-14391/1993, recording signals can not be recorded on the metal tape by using the standard type VTR 55, however, the contents recorded on the metal tape may be reproduced thereby though it is very poor picture quality because of differences of the recording format and magnetic characteristics of the tapes, from which the user is conscious of the erroneous insertion. Thus, eject mode will be established by the user who pushes the eject button 58. Incidentally, as the tapered surface "K" is provided at the distal end of the escaping slot 2a95 in which the detecting member 56b1 is inserted, the tape cassette 1C can be easily drawn out from the cassette holder 56 along the tapered surface "K" by the user. Thus, the tape cassette 1C is securely retracted from the cassette holder 56 without the decomposition of the VTR 55 or any damage of the tape cassette 1C.

<Third Embodiment>

FIG. 12(A) is a perspective view of a tape cassette illustrated from a bottom side thereof according to a third embodiment of the present invention; and FIG. 12(B) is a cross-sectional view showing a state where the tape cassette is mounted on the cassette holder of the compatible type VTR in a normal state by causing the front lid having the longer side to be the head.

FIG. 13(A) is a cross-sectional view showing a state where the tape cassette is erroneously inserted onto the cassette holder of the standard type VTR by causing the front lid of the tape cassette to be the head and is prevented from being mounted on the cassette holder; and FIG. 13(B) is a cross-sectional view showing a state where the tape cassette is erroneously inserted onto the cassette holder by causing the front lid of the tape cassette to be the head and the detecting member of the cassette holder of the standard type VTR is inserted into the escaping slot.

FIG. 14(A) is a cross-sectional view for explaining a reinforced member provided in a recess formed at a front wall of the central loading pocket; and FIG. 14(B) is a cross-sectional view for explaining a reinforced member provided in a recess formed by removing the front wall of the central loading pocket; and FIG. 14(C) is a cross-sectional view for explaining a reinforced member provided in a recess formed by removing the front wall of the loading pocket.

A W-VHS standard tape cassette 1D (a tape cassette 1D) of a third embodiment according to the present invention as shown in the FIGS. 12(A) and 12(B) has a casing 2D (a second cassette casing) which is constructed to have approximately the same size as the casing 2B (a first cassette casing) of the aforementioned tape cassette 1B in the first embodiment, thus the like parts are shown by corresponding reference characters through the several views of the drawings.

The tape cassette 1D of the third embodiment is equipped with the aforementioned metal tape "Tm" (a second magnetic tape) in the casing 2D, and is constructed for the high density recording in conformity with the W-VHS standard format (a second recording format).

In the third embodiment, the tape cassette 1D has such constructional features that an imaginary erroneous insertion preventing slot (referred to as an imaginary preventing slot) 2a63 of a first erroneous insertion preventing section is defined in the central loading pocket 2a22 instead of the preventing slot 2a62 of the first erroneous insertion preventing section provided on the bottom 2a of the casing 2C in the second embodiment and a closed area defined between the front wall 2a23 of the central loading pocket 2a22 corresponding to the distal end of the imaginary preventing slot 2a63 and the tapered surface "K" of the escaping slot 2a94 is properly reinforced by using a reinforced material 10 having larger strength than that of the casing 2D.

Specifically, the imaginary preventing slot 2a63 is defined as a length of the central loading pocket 2a22 in the direction of the arrow X1 from the front 2b of the casing 2D to the front wall 2a23 of the central loading pocket 2a22 by causing the length of the central loading pocket 2a22 to be slightly elongated. The length of the imaginary preventing slot 2a63 is made the same length of α2 mm as that of the preventing slot 2a62 provided on the casing 2C of the second embodiment.

Thus, the first erroneous insertion preventing section of the third embodiment comprises the cutout 8a provided at the central lower edge of the front lid 8a and the imaginary preventing slot 2a63 defined as the length of the central loading pocket 2a22 having the length of α2 mm, in other words, an actual preventing slot is not formed in the central loading pocket 2a22, however, the central loading pocket 2a22 serves as a preventing slot to allow the insertion of the detecting member 61b1 provided on the cassette holder 61 of the compatible type VTR 60. Incidentally, upon the insertion of casing 2D, the casing 2D is restricted in both the right-hand and left-hand directions by the cassette holder 61, thus, the imaginary preventing slot 2a63 composed of the central loading pocket 2a22 does not cause any troubles.

Further, just behind the front wall 2a23 of the central loading pocket 2a22, the escaping slot 2a94 is shallowly and straightly formed in a concave shape on the bottom 2a of the casing 2D so as to include the lamp inserting hole 2a7 at an distal end thereof for inserting the lamp (not shown) along the extended line of the imaginary preventing slot 2a63 as mentioned in the foregoing. A length from the front 2b of the casing 2D to the innermost distal end of the escaping slot 2a94 is made longer than the length of α1 mm as mentioned in the second embodiment.

Further, at the front of the lamp inserting hole 2a7, there is provided the tapered surface "K" so that the detecting member 51b1 in the escaping slot 2a94 can easily escape therefrom.

The escaping slot 2a94 is formed to allow the erroneous insertion of the tape cassette 1D onto the standard type VTR 50 as well as that of the second embodiment when the tape cassette 1D is inserted thereonto by causing the front lid 8 to be the head in such a manner that the detecting member 51b1 is inserted into the escaping slot 2a94 after the front wall 2a23 of the central loading pocket 2a22 overrides the the detecting member 51b1.

As shown in FIGS. 12(A), 12(B), the length of α2 mm from the front 2b of the casing 2D to the front wall 2a23 of the central loading pocket 2a22 is larger than the length of β2 mm from the detecting member 61b1 to the extending line of the stoppers 61b2, 61b2, thus the tape cassette 1D can be fully inserted into the compatible type VTR 60 by causing the front lid 8 to be the head without abutting of the front wall 2a23 of the central loading pocket 2a22 on the detecting member 61b1 of the cassette holder 61 of the compatible type VTR 60, from which the user is conscious of the normal insertion of the tape cassette 1D.

Further, as shown in FIGS. 13(A), 13(B), a state where the tape cassette 1D of the third embodiment is erroneously inserted into the standard type VTB 50 by causing the front lid 8 to be the head is the same as a state where the tape cassette 1C of the second embodiment is erroneously inserted onto the standard type VTR 50 as described in the foregoing referring to FIGS. 9(A), 9(B). Particularly, as shown in FIG. 13(B), when the tape cassette 1D is inserted thereonto by causing the front of the casing 2D to be inclined upward, the tape cassette 1D is allowed to be erroneously inserted onto the standard type VTR SO in such a manner that the detecting member 51b1 is inserted into the escaping slot 2a94 after the front wall 2a23 portion, i.e., the distal end wall portion of the imaginary preventing slot 2a63, of the central loading pocket 2a22 provided in the casing 2D overrides the detecting member B1b1.

Further, as shown in FIGS. 14(A)–14(C), in the tape cassette 1D of the third embodiment, the closed area defined between the front wall 2a23 of the central loading pocket 2a22 corresponding to the distal end of the imaginary preventing slot 2a63 and the tapered surface "K" of the escaping slot 2a94 is reinforced by using a reinforced material 10 (11 or 12) having larger strength than that of the casing 2D. Thus, the closed area is strong enough to endure the repeatedly abutting and overriding of the detecting member 51b1 of the cassette holder 51.

Specifically, referring to FIG. 14(A), the reinforced member 10 having a larger compressive strength than that of the material of the casing 2D is provided in a recess formed at the front wall 2a23 including the closed area, which the detecting member 51b1 repeatedly overrides, by embeding the reinforced member 10 in the recess or attaching it thereon. As the reinforced member 10 having the larger compressive strength, for instance, a metal, a thermoplastic resin and a fiber reinforced plastic (FRP) are applicable. As the material of the casing 2D, such a well known thermosetting resin as ABS (Acrylonitrile butadiene styten) is used.

Thus, the reinforced member 10 maintains high endurance without wear even when the detecting member 51b1 repeatedly abuts on and overrides the reinforced member 10.

As another example, referring to FIG. 14(B), a reinforced member 11 having larger compressive strength than that of the material of the casing 2D is provided in a recess formed by removing the closed area defined between the tapered surface "K" of the escaping slot 2a94 and the front wall 2a23 of the central loading pocket gage by being embeded or by being attached. As the reinforced material 11 having the larger compressive strength, for instance, a metal, a thermosetting resin and a fiber reinforced plastic (FRP) are applicable as mentioned in the foregoing.

Thus, the closed area maintains a high endurance even when the detecting member 51b1 abuts and rides thereon repeatedly without wear because the tapered surface "K" is formed with the reinforced member 11 as well as the front wall 2a23 of the loading pocket 2a22.

As another example, referring to FIG. 14(C), a reinforced member 12 having larger compressive strength than that of the material of the casing 2D is provided in a recess formed by removing the closed area defined between the tapered surface "K" of the escaping slot 2a94 and the front wall 2a23 of the central loading pocket 2a22 by being embeded or being attached.

The reinforced material 12 is constructed in such that a surface of the material having a larger compressive strength such as a meta 1, a thermosetting resin and a fiber reinforced plastic (FRP) is thinly covered with a well known thermoplastic resin.

Thus, the closed area maintains a high endurance without wear even when the detecting member 51b1 repeatedly abuts on and overrides the reinforced member 12 because the tapered surface "K" is formed with the reinforced member 12 as well as the front wall 2a23 of the central loading pocket 2a22.

<Forth Embodiment>

FIG. 15(A) is a perspective view of a W-VHS standard tape cassette (a tape cassette) illustrated from a bottom side thereof according to a forth embodiment of the present invention;

FIG. 15(B) is a cross-sectional view of an erroneous insertion preventing section and an escaping slot provided along a shorter side of the tape cassette;

FIG. 16(A) is a perspective view for explaining erroneous insertion preventing operation of the tape cassette in the forth embodiment, wherein the tape cassette is going to be inserted in a normal manner in the direction of an arrow X1 onto a cassette holder provided in the compatible type VTR by causing a front lid of the tape cassette to be the head;

FIG. 16(B) is a cross-sectional view showing a state where the tape cassette is mounted on the cassette holder in a normal state;

FIG. 16(C) is a cross-sectional view showing a state where the tape cassette of the forth embodiment is erroneously inserted onto the cassette holder of the compatible type VTB by causing the front lid of the tape cassette to be the rear and is prevented from being mounted on the cassette holder; and FIG. 16(D) is a cross-sectional view showing a state where the tape cassette is erroneously inserted onto the cassette holder by causing the front lid of the tape cassette to be the rear and the detecting member of the cassette holder is finally inserted into the escaping slot.

FIG. 17(A) is a perspective view for explaining erroneous insertion preventing operation of the tape cassette in the forth embodiment, wherein the tape cassette is erroneously inserted in the direction of an arrow X1 onto a cassette holder provided in the standard type VTR by causing a front lid of the tape cassette to be the head;

FIG. 17(B) is a cross-sectional view showing a state where the tape cassette of the forth tape cassette is erroneously inserted onto the cassette holder of the standard type VTR by causing the front lid of the tape cassette to be the head and is prevented from being mounted on the cassette holder; and FIG. 17(C) is a cross-sectional view showing a state where the tape cassette is erroneously inserted onto the cassette holder thereof by causing the front lid of the tape cassette to be the head and the detecting member of the cassette holder is finally inserted into the escaping slot.

FIG. 18(A) is a plan view for explaining an erroneous insertion of the tape cassette on the cassette holder of the standard type VTR by causing the front lid to be the head, wherein the tape cassette is prevented from the erroneous insertion;

FIG. 18(B) is a plan view for explaining an erroneous insertion of the tape cassette on the cassette holder of the standard type VTR by causing the front lid to be the head, wherein the detecting member of the cassette holder is inserted into the escaping slot by overriding a preventing door provided at a front wall of the central loading pocket; and FIG. 18(C) is a plan view for explaining an erroneous insertion on the cassette holder of the standard type VTR by causing the front lid to be the head, wherein the detecting member opens the preventing door with ejecting operation of the tape cassette.

A W-VHS standard tape cassette 1E (referred to a tape cassette 1E) of a forth embodiment according to the present invention as shown in the FIGS. 15(A), 15(B) has a casing 2E (a second cassette casing) which is constructed to have approximately the same sizes as the casing 2B (a first cassette casing) of the aforementioned tape cassette 1B in the first embodiment, thus the like parts are shown by corresponding reference characters through the several views of the drawings.

The W-VHS tape cassette 1E (referred to a tape cassette 1E hereinafter) of the forth embodiment is equipped with the metal tape "Tm" (a second magnetic tape) made of a film base having a ½-in width, and is constructed for a high density recording use (a second recording format) as mentioned in the foregoing. The metal tape "Tm" is different from the aforementioned iron oxide tape (a first magnetic tape) "To" which has the ½-in width and is constructed as the standard recording tape cassette in conformity with the VHS standard format (a first recording format). The tape cassette 1E is adaptable to the compatible VTR 60 shown in FIG. 16(A), which is constructed in conformity with both the high recording density format such as the W-VHS format and the standard recording format such as the VHS format as mentioned in the foregoing.

In the forth embodiment, the tape cassette 1E has such constructional features that a length of an imaginary erroneous insertion preventing slot (referred to as an imaginary preventing slot) 12a62 defined in a central loading pocket gag is made shorter than that of the preventing slot 2a61 of the prior art to prevent the tape cassette 1E from being erroneously inserted onto the standard VTR 50 when the tape cassette 1E is inserted thereonto by causing the front lid 8 to be the head, and to allow the normal insertion of the tape cassette 1E onto the compatible type VTR 60 by causing the front lid 8 to be the head, and to prevent the tape cassette 1E from being erroneously inserted onto the compatible type VTR 60 by causing the rear side 2e of a casing 2E thereof to the head.

Further, as a erroneous insertion preventing measure when the tape cassette 1E is inserted onto the standard type VTR 50 by causing the front lid 8 of tape cassette 1E to be the head and the tape cassette 1E to be inclined upward forcibly, a preventing door 9 is provided in openable and closable manners in the front wall 2a21 of the central loading pocket 2a2 in a position corresponding to the distal end of the imaginary preventing slot 12a62, and an escaping slot 2a8 is provided in the direction of the rear side 2e of the casing 2E just behind the preventing door 9 for allowing the erroneous insertion of the tape cassette 1E onto the standard type VTR 50 by causing the detecting member 51b1 of the standard type VTR 50 to insert thereinto.

Thus, the tape cassette IE of the forth embodiment is allowed to be inserted onto the compatible type VTR 60, on the other hand, it is prevented from being inserted onto the standard type VTR 50 erroneously but not forcibly as described hereinafter.

Next, referring to FIGS. 15(A), 15(B), an erroneous insertion preventing section for allowing a normal insertion of the tape cassette 1E onto the compatible type VTR 60 by causing the front lid 8 to be the head is provided approximately at a center of the casing 2E corresponding to the erroneous insertion preventing section (8a, 2a61) of the prior art.

The erroneous insertion preventing section comprises a cutout 8a shallowly provided approximately at a center of the lower edge of the front lid 8 and an imaginary insertion preventing slot (referred to as an imaginary preventing slot hereinafter) 12a62 defined as a length of the central loading pocket 2a2 from the front 2b of the casing 2E to the front wall 2a21 of the central loading pocket 2a2, which is illustrated with the two-dot chain line. The length of the imaginary preventing slot 12a62 is determined at α2 mm which is substantially shorter than the length α1 mm of the preventing slot 2a61 of the prior art. Thus, the erroneous insertion preventing section composed of the cutout 8a of the front lid 8 and the imaginary preventing slot 12a62 in the central loading pocket 2a2 is disposed along a straight line, in other words, the imaginary preventing slot 12a62 composed of the central loading pocket 2a2 is not actually formed in a concave shape, however, it allows the detecting member 51b1 of the cassette holder 51 of the standard type VTB 50 or the detecting member 6161 of the cassette holder 61 of the compatible type VTB 60 to be straightly inserted thereinto. Upon the insertion of the tape cassette 1E, the longer side direction of the casing 2E which is perpendicular toward the cassette insertion direction is restricted by the cassette holder 51 or 61, thus the imaginary preventing slot 12a62 composed of the central loading pocket 2a2 does not causes any problems.

Further, the preventing door 14, one of the main parts of the present invention, is pivoted at an axis 13 provided on the front wall 2a21 of the central loading pocket 2a2 being biased in a door closed direction by a torsion spring (not shown). The preventing door 14 is allowed to be opened toward a front direction (i.e., the front lid 8 direction) of the tape cassette 1E and inhibited to be opened toward a rear direction (i.e., an opposite direction of the front lid 8 direction) thereof. When the preventing door 14 is closed, the front face of the preventing door 14 is flush with the front face of front wall 2a21 of the central loading pocket 2a2 and makes a distal end of the imaginary preventing slot 12a62.

Moreover, the escaping slot 2a8, one of the main parts of the present invention, for escaping the detecting members 51b1 of the cassette holders 51 therein, is formed on the bottom 2a of the casing 2E to communicate to the imaginary preventing slot 12a62 of the central loading pocket 2a2 when the preventing door 14 is opened in the front direction of the tape cassette 1E.

Specifically, the escaping slot 2a8 is straightly and shallow provided in a concave shape on the bottom 2a from the distal end of the imaginary preventing slot 12a62, i.e., just behind the preventing door 14. As a height of the preventing door 14 is constructed larger than that of the imaginary preventing slot 12a62, a starting end of the escaping slot 2a8 is shut by the preventing door 14 so as to not communicate to the distal end of the imaginary preventing slot 12a62 when the preventing door 14 is closed. On the other hand, when the preventing door 14 is opened, both the escaping and the imaginary preventing slots 2a8, 12a62 are connected in line. Incidentally the escaping slot 2a8 is provided with the lamp inserting hole 2a7 as mentioned in the foregoing.

The length from the distal end of the escaping slot 2a8 to the front 2b of the casing 2E is determined to be more than α1 mm.

Thus, the escaping slot 2a8 is formed to allow the erroneous insertion of the tape cassette 1E onto the standard type VTR 50 by causing the front lid 8 of the tape cassette 1E to be the head in such a manner that the detecting member 51b1 of the cassette holder 51 is inserted into the escaping slot 2a8 by causing the preventing door 14 to override the detecting member 51b1 as mentioned hereinafter.

The preventing door 14 provided on the casing 2E has a function of a stopper against the detecting member 51b1 of the cassette holder 51 when the tape cassette 1E is erroneously inserted onto the cassette holder 51 by causing the front lid 8 of the casing 2E to be the head in such a manner that the preventing door 14 is held in the closed state by the torsion spring (not shown).

Next, when the tape cassette 1E is forcibly inserted onto the cassette holder 51 by causing the lid 8 to be the head and the detecting member 51b1 is inserted into the escaping slot 2a8 as mentioned in the foregoing, the tape cassette 1B can be easily retracted from the cassette holder 51 because the preventing door 14 is opened into the central loading pocket 2a2 in the direction of the front 2b of the tape cassette 1B against the biasing force of the torsion spring with the retracting operation of the tape cassette 1E, thus the detecting member 51b1 can be escaped from the escaping slot 2a8. Incidentally, the preventing door 14 can be opened without contacting with the metal tape "Tm" because the length of the preventing door 14 is determined such a manner.

Further, the escaping slot 2a91 is also formed on the bottom 2a of the casing 2E of the forth embodiment along an extended line of the escaping slot 2a8 and the erroneous insertion preventing section (8a , 12a62). However, the construction of the escaping slot 2a91 is described in the first embodiment of the present invention as shown in FIGS. 5(A)~5(D), thus the description thereof is omitted here.

Next, a description is given of the erroneous inserting operation of the tape cassette 1E onto the compatible type VTR 60, referring to FIGS. 16(A)~16(D), however, the construction of the compatible type VTR 60 is described in the second embodiment of the present invention, thus its description is also omitted here.

As shown in FIGS. 16(A)~16(B), the tape cassette 1E is inserted into the cassette holder 61 of the compatible type VTR 60 from the inlet 61a by causing the front lid 8 to be the head so as to be mounted on the bottom 61b thereof. With the insertion of the tape cassette 1E, the casing 2E is restricted and guided by the inlet 61a and inner side faces 61c, 61d of the cassette holder 61 by causing both sides 2c, 2d of the casing 2E to contact the inner side faces 61c, 61d of the cassette holder 61, so that the detecting member 61b1 provided on the inner position of the cassette holder 61 is inserted into and passed by the cutout 8a of the front lid 8, and the imaginary preventing slot 12a62 composed of the central loading pocket 2a2 in this order.

The length of α2 mm is larger than the length of β2 mm as mentioned in the foregoing, thus the tape cassette 1E is fully inserted in the cassette holder 61 until the front 2b of the casing 2E abuts on the stoppers 61b2, 61b2 without abutting of the front face of the preventing door 14 on the detecting member 61b1 of the cassette holder 61, from which it is known that the tape cassette 1E is normally inserted onto the cassette holder 61.

When the tape cassette 1E is inserted onto or retracted from the cassette holder 61 by the front lid 8 having the longer side thereof, the preventing door 14 provided at the front wall 2a21 of the central loading pocket 2a2 is held in the closed state by the torsion spring (not shown). Thus, when the tape cassette 1E is normally inserted onto the cassette holder 61, the detecting member 61b1 is not inserted into the escaping slot 2a8 provided behind the preventing door 14 because the detecting member 61b1 does not reach the front face of the preventing door 14.

As shown in FIG. 16(C), when the tape cassette 1E is erroneously inserted onto the cassette holder 61 by causing the rear side 2e having the longer side thereof to be the head and by causing the bottom 2a of the casing 2E to be parallel to the bottom 61b of the cassette holder 61, the rear side 2e of the casing 2E abuts on the detecting member 61b1, thus the tape cassette 1E is not fully inserted onto the cassette holder 61 till a predetermined position leaving most of the casing 2E outside, from which the user can acknowledge the erroneous insertion of the tape cassette 1E.

Further, as shown in FIG. 16(D), when the tape cassette 1E is erroneously inserted onto the cassette holder 61 in the same direction as shown in FIG. 16(C), there is a slight clearance between the back face of the upper plate 61f of the cassette holder 61 and the upper surface 2f of the casing 2E because the height of the cassette holder higher than that of the casing 2E as mentioned in the foregoing. In this state, when the tape cassette 1E is inserted onto the cassette holder 61 by causing the rear side 2e thereof to be the head and by causing the tape cassette 1E to be inclined upward forcibly, a front wall of the rear side 2e rides on the detecting member 61b1. When the tape cassette 1E is further forcibly inserted onto the cassette holder 61 by a user who is not conscious of it, the detecting member 61b1 is inserted into the escaping slot 2a91 after the front wall of the rear side 2e overrides the detecting member 61b1.

As the length of the escaping slot 2a91 is formed more than the length of α1 mm, the detecting member 61b1 remains within the escaping slot 2a91 without abutting on the distal end thereof until the the rear side 2e abuts on the stoppers 61b2, 61b2. Thus, the tape cassette 1E is fully inserted into the cassette holder 61 in the erroneous state.

After that, before the tape cassette 1B is transferred to the cassette holding position of the compatible type VTR 60 by the cassette holder 61, the eject-mode can be automatically established by detecting that the front lid 8 can not be opened by the lid opening device of the apparatus, or can be established by the user who is conscious of his erroneous insertion and pushes the eject button 63. Thus, the tape cassette 1E can be taken out from the cassette holder 61 by the user. Incidentally, the tapered surface "K" is provided at the distal end of the escaping slot 2a91 on the rear side 2e, thus the tape cassette 1E can be easily drawn out from the cassette holder 61 along the tapered surface "K".

As will be understood from the above description, the tape cassette 1E is securely retracted from the cassette holder 61 without the decomposition of the compatible type VTR 60 or any damage of the tape cassette 1E even when the tape cassette 1E is erroneously inserted onto the cassette holder 61 of the compatible type VTR 60 by causing the rear side 2e having the longer side thereof to be the head and by causing the tape cassette 1E to be forcibly inclined upward.

Next, a description is given of the erroneous insertion of the tape cassette 1E onto the standard type VTR 50, referring to FIGS. 17(A)~18(C).

As shown in FIGS. 17(A)~17(B) and 18(A), when the tape cassette 1E is erroneously inserted onto the cassette holder 51 of the standard type VTR 50 by causing the front lid 8 having the longer side to be the head, there is a slight clearance between the back face of the upper plate 51f of the cassette holder 51 and the upper surface 2f of the casing 2E.

However, when the tape cassette 1E is inserted by causing the front lid 8 to be the head and by causing the the bottom 2a of the casing 2E to be parallel to the bottom 51b of the cassette holder 51, the detecting member 51b1 of the cassette holder 51 is inserted into the cutout 8a of the front lid 8 and the imaginary preventing slot 12a62 composed of the central loading pocket 2a2. The detecting member 51b1 abuts on the front face of the preventing door 14 and the tape cassette 1E is prevented from being fully inserted because the length β1 mm from the line parallel to the stoppers 51b2, 51b2 to the distal end of detecting member 51b1 is longer than the length α2 mm of the imaginary preventing slot 12a62, from that the user can acknowledge the erroneous insertion of the tape cassette 1E.

In the FIGS. 17(C) and 18(B), when the tape cassette 1E is erroneously inserted onto the cassette holder 51 of the standard type VTR 50 by causing the front lid 8 to be the head, there is a slight clearance between the back face of the upper plate 51f of the cassette holder 51 and the upper surface 2f of the casing 2E as mentioned in the foregoing.

Thus, when the tape cassette 1E is inserted the cassette holder 51 by causing the front lid 8 to be the head and by causing the the bottom 2a of the casing 2E to be inclined upward forcibly, the preventing door 14 rides on the detecting member 51b1 because the preventing door 14 is held by the torsion sprig (not shown) in the closed state at the distal end of the imaginary preventing slot 12a62 in the central loading pocket 2a2. The detecting member 51b1 is inserted into the escaping slot 2a8 including the lamp inserting hole 2a7 by overriding the preventing door 14 with the further forcible insertion by the user who is not conscious of his erroneous insertion. The length of the escaping slot 2a8 is determined more than the length of α1 mm as mentioned in the foregoing, thus, the tape cassette 1E is allowed to be erroneously inserted onto the cassette holder 51 until the front 2b of the casing 2E abuts on the stoppers 51b2 by causing the detecting member 51b1 to be held within the escaping slot 2a8 without abutting on the end of the escaping slot 2a8.

After that, the tape cassette 1E is transferred to the cassette holding position downward by the cassette holder 51. On the way, the lid 8 of the tape cassette 1E is opened by the lid opening mechanism (not shown), and the metal tape "Tm" is drawn out from the tape cassette 1E to be wound around the rotary drum (not shown). As disclosed in the Japanese Utility Model Laid-open Publication No. 5-14391/1993, recording signals can not be recorded on the metal tape by using the standard type VTR 50, however, the contents recorded on the metal tape may be reproduced thereby though it may be very poor picture quality because of differences of the recording format and magnetic characteristics of the magnetic tape, from which the user is conscious of the erroneous insertion. Thus, eject mode will be established by the user who pushes the eject button 53 of the standard type VTR 50.

As shown in FIG. 18(C), when the tape cassette 1E is retracted from the cassette holder 51, the preventing door 14 is pushed and opened by the detecting member 51b1 inserted in the escaping slot 2a8 in the retracting direction against the biasing force of the spring (not shown), thus the detecting member 51b1 can be easily escaped from the escaping slot 2a8. The preventing door 14 is returned to the closed state by the torsion spring (not shown) after the detecting member 51b1 is escaped from the escaping slot.

Thus, when the tape cassette 1E is erroneously and forcibly inserted onto the standard type VTR 50 by causing the front lid 8 to be the head and by causing the casing 2E to be inclined upward carelessly, the tape cassette 1E is securely retracted from the cassette holder 51 of the standard type VTR 50 without giving any damages to the tape cassette 1E and the standard type VTR 50.

What is claimed is:

1. A tape cassette used for a magnetic recording and reproducing apparatus comprising:

a case being a rectangular box-like shape having front, rear and side portions, a length of the front and rear portions being longer than a length of the side portions, the case having a loading pocket provided along the front portion;

a magnetic tape wound on a pair of reels accommodated in the case and extended along the loading pocket;

a front lid provided at the front portion in opening and closing manners to respectively expose and cover the magnetic tape;

first slot means provided on said bottom of the case along a center line substantially equidistant from said side portions of said case and communicating with the loading pocket for preventing erroneous insertion of the tape cassette into the magnetic recording and reproducing apparatus, the first slot means extending along a normal insertion direction of the tape cassette for allowing the tape cassette to be inserted in the normal insertion direction, with the front lid being forward, into a cassette holder having an erroneous insertion preventing and detecting member provided in the magnetic recording and reproducing apparatus, causing the erroneous insertion preventing and detecting member to be engaged with the first slot means; and second slot means having a predetermined depth provided on the bottom of the case and having a first and second end aligned with said first slot means with said second end being nearby the rear portion of said case, leaving a predetermined small space from a wall of the rear portion, the second slot means being disposed along an erroneous insertion direction of the tape cassette for allowing the erroneous insertion thereof, with the rear portion being forward into the cassette holder, causing the erroneous insertion preventing and detecting member to be inserted into the second slot means after the wall of the rear portion overriding the erroneous insertion preventing and detecting member upon further insertion of the tape cassette in the erroneous insertion direction, said second slot means having a tapered wall at said second end thereof, said tapered wall being inclined in the direction of said depth of said second slot means so as to allow the erroneous insertion preventing and detecting member to escape from the second slot means in a direction parallel to said side portion of said case.

2. An improved tape cassette for use in a magnetic recording and reproducing apparatus, said improved tape cassette comprising:

a case being a rectangular box-like shape having front and rear portions, a side portion, and a loading pocket provided along the front portion, said loading pocket having a front wall;

a magnetic tape for recording and reproducing information signals thereon, the magnetic tape being wound on a pair of reels accommodated in the case of said improved tape cassette and extended along the loading pocket;

a front lid provided at the front portion of said case in opening and closing manners to respectively expose and cover the magnetic tape, wherein said improved tape cassette can be inserted, with the front lid being forward, into a cassette holder of said magnetic recording and reproducing apparatus for said improved tape cassette;

an erroneous insertion preventing slot communicating with said loading pocket of said improved tape cassette, the erroneous insertion preventing slot having a length substantially identical to a length from the front portion of said case to said front wall of the loading pocket;

a door provided on the front wall of the loading pocket of said improved tape cassette and being mounted in opening and closing manners; and an escaping slot provided on a bottom of the case of said improved tape cassette and behind said door, said escaping slot being arranged along a line including said erroneous insertion preventing slot, the escaping slot extending in an inserting direction of said improved tape cassette into the magnetic recording and reproducing apparatus, the magnetic recording and reproducing apparatus having an erroneous insertion preventing and detection member, means for allowing the door to open toward the front portion of the case and preventing said door from opening toward the rear portion of the improved tape cassette, wherein said improved tape cassette is allowed to be erroneously inserted into the cassette holder by causing said erroneous insertion preventing and detecting member of said apparatus to be inserted into the escaping slot after the door held in a closed state overrides the erroneous insertion preventing and detecting member, and the improved tape cassette is allowed to be retracted by causing the door to be opened when the tape cassette is ejected from the magnetic recording and reproducing apparatus.

3. A tape cassette used for a magnetic recording and reproducing apparatus comprising:

a case being a rectangular box-like shape having front and rear portions, and first and second side portions, the first side portion being opposed to the second side portion, a length of the front and rear portions being longer than a length of the first and second side portions, the case having a loading pocket provided along the front portion;

a magnetic tape wound on a pair of reels accommodated in the case and extended along the loading pocket;

a front lid provided at the front portion in opening and closing manners to respectively expose and cover the magnetic tape;

a first slot provided on a bottom of the case for preventing an erroneous insertion of the tape cassette into the magnetic recording and reproducing apparatus, the first slot extending from a wall of the first side along a normal insertion direction of the tape cassette for allowing the tape cassette being inserted in the normal insertion direction, with the first side portion being forward, into a cassette holder having an erroneous insertion preventing and detecting member provided in the magnetic recording and reproducing apparatus, causing the erroneous insertion preventing and detecting member to be engaged with the first slot; and a second slot provided on the bottom of the case nearby the second side portion leaving a predetermined small space from a wall of the second side portion, the second slot being disposed along an erroneous insertion direction of the tape cassette for allowing the erroneous insertion thereof with second side portion being forward into the cassette holder, causing the erroneous insertion preventing and detecting member to be inserted into the second slot after a wall of the second side portion overriding the erroneous insertion preventing and detecting member upon further insertion of the tape cassette in the erroneous insertion direction.

4. A tape cassette as claimed in claim 3, wherein the second slot has a tapered wall at a distal end thereof for enabling the erroneous insertion preventing and detecting member to escape from the second slot.

5. An improved tape cassette for use in a magnetic recording and reproducing apparatus, said improved tape cassette comprising:

a case being a rectangular box-like shape having a front portion, a side portion, and a loading pocket provided along the front portion;

a magnetic tape for recording and reproducing information signals thereon, the magnetic tape being wound on a pair of reels accommodated in the case of said improved tape cassette and extended along the loading pocket;

a front lid provided at the front portion of said case in opening and closing manners to respectively expose and cover the magnetic tape;

an erroneous insertion preventing slot communicating with said loading pocket and provided in a desired position, the erroneous insertion preventing slot of said improved tape cassette having a wall at one end thereof; and an escaping slot having a predetermined depth provided on a bottom of the case of said improved tape cassette slightly spaced from the erroneous insertion preventing slot aligned with said erroneous insertion preventing slot to leave a predetermined small space from said wall of the erroneous insertion preventing slot, wherein said improved tape cassette is allowed to be erroneously inserted, with the front lid being forward, into a cassette holder having an erroneous insertion preventing and detecting member provided in a magnetic recording and reproducing apparatus and by causing the erroneous insertion preventing and detecting member to be inserted in the escaping slot after said wall of the erroneous insertion preventing slot overrides the erroneous insertion preventing and detecting member and wherein the escaping slot has a tapered wall nearby said predetermined small space, said tapered wall being inclined in the direction of said depth of said escaping slot so as to allow the erroneous insertion preventing and detecting member to escape from the escaping slot in a direction parallel to said side portion of said case.

6. An improved tape cassette for use in a magnetic recording and reproducing apparatus, said improved tape cassette comprising:

a case being a rectangular box-like shape having a front portion, a side portion, and a loading pocket provided along the front portion;

a magnetic tape for recording and reproducing information signals thereon, the magnetic tape being wound on a pair of reels accommodated in the case of said improved tape cassette and extended along the loading pocket;

a front lid provided at the front portion of said case in opening and closing manners to respectively expose and cover the magnetic tape;

an erroneous insertion preventing slot communicating with said loading pocket and provided in a desired position, the erroneous insertion preventing slot of said improved tape cassette having a wall at one end thereof; and an escaping slot having a predetermined depth, provided on a bottom of the case of said improved tape cassette and having a first and second end aligned with said erroneous insertion preventing slot to leave a closed area between said wall and said second end of said escaping slot, the escaping slot having a tapered wall provided at said second end thereof near said closed area, the tapered wall being inclined in the direction of said depth of said escaping slot so as to allow an erroneous insertion preventing and detecting member of the apparatus to escape from the escaping slot in a direction parallel to said side portion of said case, the closed area being reinforced with a material having a larger strength than that of the case of said improved tape cassette, wherein said improved tape cassette is allowed to be erroneously inserted, with the front lid being forward, into a cassette holder having an erroneous insertion preventing and detecting member provided in a magnetic recording and reproducing apparatus by causing the erroneous insertion preventing and detecting member to be inserted into the escaping slot after the closed area overrides the erroneous insertion preventing and detecting member.

7. An improved tape cassette for use in a magnetic recording and reproducing apparatus, said improved tape cassette comprising:

a case being a rectangular box-like shape having a front portion, a side portion, and a loading pocket provided along the front portion;

a magnetic tape for recording and reproducing information signals thereon, the magnetic tape being wound on a pair of reels accommodated in the case of said improved tape cassette and extended along the loading pocket;

a front lid provided at the front portion of said case in opening and closing manners to respectively expose and cover the magnetic tape;

an erroneous insertion preventing slot communicating with said side portion and provided in a desired position the erroneous insertion preventing slot of said improved tape cassette having a wall at one end thereof; and an escaping slot having a predetermined depth, provided on a bottom of the case of said improved tape cassette and having a first and second end aligned with said erroneous insertion preventing slot to leave a predetermined small space between said second end and said wall, in a direction parallel to said front portion of said case, said escaping slot having a tapered wall provided at said second end thereof, said tapered wall being inclined in the direction of said depth of said escaping slot so as to allow an erroneous insertion preventing and detecting member of the apparatus to escape from said escaping slot in a direction parallel to said front portion of said case, wherein said improved tape cassette is allowed to be erroneously inserted, with the side portion being forward, into a cassette holder having an erroneous insertion preventing and detecting member provided in a magnetic recording and reproducing apparatus and by causing the erroneous insertion preventing and detecting member to be inserted in the escaping slot after said wall of the erroneous insertion preventing slot overrides the erroneous insertion preventing and detecting member.

* * * * *